United States Patent [19]
Ooe

[11] Patent Number: 5,978,803
[45] Date of Patent: Nov. 2, 1999

[54] INFORMATION RETRIEVAL SYSTEM

[75] Inventor: Kazuichi Ooe, Kawasaki, Japan

[73] Assignee: Fujitsu Limited, Kawasaki, Japan

[21] Appl. No.: 08/743,669

[22] Filed: Nov. 5, 1996

[30] Foreign Application Priority Data

Nov. 8, 1995 [JP] Japan ................................. 7-290218

[51] Int. Cl.⁶ ................................................. G06F 17/30
[52] U.S. Cl. ................................................. 707/10
[58] Field of Search ........................................ 707/10

[56] References Cited

U.S. PATENT DOCUMENTS

| | | | |
|---|---|---|---|
| 4,870,568 | 9/1989 | Kahle et al. | 707/5 |
| 5,146,590 | 9/1992 | Lorie et al. | 707/7 |
| 5,179,683 | 1/1993 | Murakami et al. | 395/841 |
| 5,349,675 | 9/1994 | Fitzgerald et al. | 379/102.01 |
| 5,367,677 | 11/1994 | Stanfill | 707/3 |
| 5,437,032 | 7/1995 | Wolf et al. | 395/673 |
| 5,495,606 | 2/1996 | Borden et al. | 707/3 |
| 5,555,404 | 9/1996 | Torbjornsen et al. | 707/202 |
| 5,666,524 | 9/1997 | Kunkel et al. | 707/3 |
| 5,765,146 | 6/1998 | Wolf et al. | 707/2 |

FOREIGN PATENT DOCUMENTS

| | | |
|---|---|---|
| 2-69855 | 3/1990 | Japan . |
| 2-297670 | 12/1990 | Japan . |
| 6-28401 | 2/1994 | Japan . |

OTHER PUBLICATIONS

Gottemukkala, V. "Scalability Issusses in Distributed and Parallel Databases", PH.D. Dissertation, Georgia Institute of Technology, pp. 1–39, Sep. 1995.

Edelstein, H. "The Power of Parrallel Database", DBMS, vol. 8, No. 3, p. (3), Mar. 1995.

*Primary Examiner*—Jack M. Choules
*Attorney, Agent, or Firm*—Staas & Halsey, LLP

[57] ABSTRACT

The invention provides an information retrieval system wherein, even when a plurality of data bases are retrieved simultaneously, information retrieval can be performed at a high speed without necessity for special hardware and without being influenced by the magnitudes of the data bases of a retrieval object. The information retrieval system includes a plurality of retrieval servers for performing retrieval processing, and a retrieval management server for managing operation of the plurality of retrieval servers. The retrieval management server is constructed so as to divide a data base of a retrieval object and relating information regarding the data base and allocate resulting divided parts of the data base and the relating information corresponding to the divided parts in sets to some or all of the plurality of retrieval servers. The plurality of retrieval servers are constructed so as to perform information retrieval for the divided parts of the data base allocated by the retrieval management server parallelly to and independently of each other.

33 Claims, 20 Drawing Sheets

INFORMATION RETRIEVAL SYSTEM

BACKGROUND OF THE INVENTION

1. Field of the Invention

This invention relates to an information retrieval system, and more particularly to an information retrieval system which retrieves desired information at a high speed from various data bases such as a file system.

2. Description of the Related Art

As well known in the art, since information retrieval processing of an information retrieval system is performed using a large amount of resources of a computer such as a central processing unit (CPU), a memory and input/output (I/O) apparatus, the load to the computer sometimes becomes very heavy, resulting in a drop of the speed of retrieval.

Thus, in an ordinary information retrieval system, hardware for exclusive use for information retrieval and so forth is added to reduce the load to the computer in order to achieve improvement in speed of retrieval.

However, even where hardware for exclusive use for information retrieval is added as described above, as the scale of a data base which makes an object of retrieval such as, for example, a text base which holds text documents such as news papers and patent documents has a large scale, the speed of retrieval is decreased still from a limitation in retrieval capacity of the hardware. Further, addition of such hardware for exclusive use for information retrieval is very disadvantageous also in terms of the cost.

Further, generally since an information retrieval system is basically a sequential system, that is, a system wherein comparison and determination processing of information in a text base and information to be retrieved is effected sequentially to perform retrieval, it has another subject to be solved in that, for example, when a plurality of users must simultaneously utilize the system to retrieve a plurality of text bases or a like case, the speed of retrieval is decreased remarkably.

SUMMARY OF THE INVENTION

It is an object of the present invention to provide an information retrieval system wherein, even when a plurality of text bases (data bases) are retrieved simultaneously, information retrieval can be performed at a high speed without the necessity for special hardware and without being influenced by the magnitudes of the text bases.

To this end, according to a basic concept of the present invention, a data base of an object of retrieval is divided into a plurality of parts, and information retrieval for the divided parts is performed parallelly to and independently of each other by a plurality of retrieval servers.

More specifically, in order to achieve the object described above, according to the present invention, there is provided an information retrieval system, comprising a plurality of retrieval servers for performing retrieval processing, and a retrieval management server for managing operation of the plurality of retrieval servers, the retrieval management server being constructed so as to divide a data base of a retrieval object and relating information regarding the data base and allocate resulting divided parts of the data base and the relating information corresponding to the divided parts in sets to some or all of the plurality of retrieval servers, the plurality of retrieval servers being constructed so as to perform information retrieval for the divided parts of the data base allocated by the retrieval management server parallelly to and independently of each other.

Accordingly, with the information retrieval system, even if the data base of a retrieval object is large, the load of information retrieval processing by each of the retrieval servers is very light. Consequently, even when information retrieval for a plurality of data bases is performed simultaneously in response to retrieval requests from a plurality of users, the processing can be performed at a very high speed without the necessity for special hardware.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENT a. Aspect of the Invention

Figure 1:
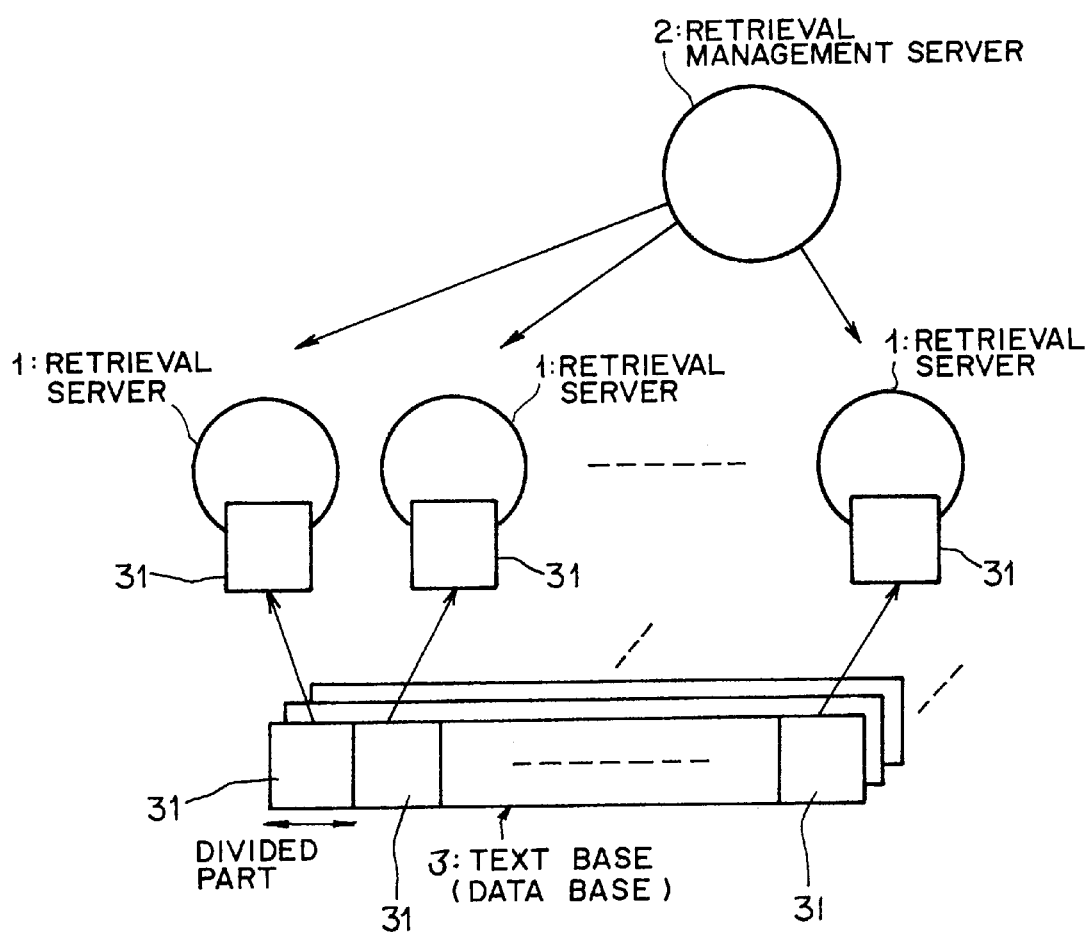
FIG. 1 is a block diagram of an information retrieval system illustrating an aspect of the present invention.

FIG. 1 shows in block diagram an information retrieval system according to an aspect of the present invention. Referring to FIG. 1, the information retrieval system shown includes a plurality of retrieval servers 1 for performing retrieval processing, and a retrieval management server 2 for managing operation of the plurality of retrieval servers 1. A text base (data base) 3 of a retrieval object makes an object of retrieval processing by the retrieval servers 1.

The retrieval management server 2 is constructed so as to divide the text base 3 of a retrieval object and relating information regarding the text base 3 and allocate resulting divided parts 31 of the text base 3 and the relating information corresponding to the divided parts 31 in sets to some or all of the plurality of retrieval servers 1. The plurality of retrieval servers 1 are constructed so as to perform information retrieval for the divided parts 31 of the text base 3 allocated by the retrieval management server 2 parallelly to and independently of each other.

In the information retrieval system described above, the retrieval management server 2 divides the text base 3 of a retrieval object and relating information regarding the text base 3 and allocates them to some or all of the plurality of retrieval servers 1, and the plurality of retrieval servers 1 perform information retrieval for the divided parts 31 of the text base 3 allocated thereto parallelly to and independently of each other. Accordingly, even if the text base 3 of a retrieval object is large, the load of information retrieval processing by each of the retrieval servers 1 is very light, and even when information retrieval for a plurality of text bases 3 is performed simultaneously in response to retrieval requests from a plurality of users, the processing can be performed at a very high speed without the necessity for special hardware.

Particularly, the retrieval management server 2 includes the following components:

(1a) a retrieval server management section for managing, for each of the retrieval servers 1, retrieval server information including a name of the text base 3 for which the retrieval server 1 takes charge of retrieval and an amount of data of one of the divided parts 31 for which the retrieval server 1 takes charge of retrieval of the text base 3;

(2a) a text base management section for managing, for each of text bases 3 each of which may serve as the text base 3 of a retrieval object, a name of the text base 3, a name of a text file for storing a substance of the text base 3, and a name of a relating information file (related file) for storing relating information regarding the text base 3;

(3a) a division number decision section for deciding, before retrieval of a text base 3 is started, a division number of the text base 3 based on size information of the text base 3 and load situations of the retrieval servers 1 obtained from the retrieval server information managed by the retrieval server management section of paragraph (1a) above;

(4a) a retrieval server allocation section for selectively allocating, in accordance with the division number decided by the division number decision section of paragraph (3a) above and the load situations of the retrieval servers 1, the text base 3 and the relating information of the text base 3 to the retrieval servers 1 in the ascending order of the load; and (5a) a loading instruction section for sending, based on a result of the allocation by the retrieval server allocation section of paragraph (4a) above, a loading instruction for loading one of the divided parts 31 of the text base 3 and the relating information into a designated one of the retrieval servers 1 to those of the retrieval servers 1, to which retrieval is allocated by the retrieval server allocation section, together with the name of the text file and the name of the relating information file managed by the text base management section of paragraph (2a) above.

Consequently, the retrieval management server 2 described above selectively allocates, in accordance with the division number of the text base 3 and the load situations of the retrieval servers 1, the text base 3 and the relating information of the text base 3 to the retrieval servers 1 in the ascending order of the load (in the descending order of the available memory amount). Accordingly, such a situation that the load to a particular retrieval server 1 becomes very heavy is prevented, and the retrieval servers 1 can perform information retrieval processing normally at a high speed in an optimum load situation.

Meanwhile, each of the retrieval servers 1 includes the following components:

(1b) a file access section for reading in, when the loading instruction is received from the retrieval management server 2, one of the divided parts 31 of the text base 3 and the corresponding relating information designated by the name of the text file and the name of the relating information file included in the loading instruction;

(2b) a retrieval section for performing, when a retrieval request is received, information retrieval for the divided part 31 of the text base 3 read in by the file access section of paragraph (1b) above; and (3b) a retrieval result send-out section for returning a result of the retrieval by the retrieval section of paragraph (2b) above to a source of the retrieval request.

Consequently, each of the retrieval servers 1 reads in one of the divided parts 31 of the text base 3 and the corresponding relating information designated by the name of the text file and the name of the relating information file included in the loading instruction from the retrieval management server 2 and performs information retrieval, or in short, performs information retrieval only for the divided part 31 of the text base 3 allocated by the retrieval management server 2 so as to take charge of retrieval of it. Accordingly, such parallel and independent processing of information retrieval as described above can be realized readily, and information retrieval for the text base 3 of a retrieval object can be performed at a very high speed.

Alternatively, the retrieval management server 2 may include the following components:

(1c) a retrieval server management section for managing, for each of the retrieval servers 1, retrieval server information including a name of the text base 3 for which the retrieval server 1 takes charge of retrieval, an amount of data of one of the divided parts 31 for which the retrieval server 1 takes charge of retrieval of the text base 3, and an available memory amount;

(2c) a text base management section for managing, for each of text bases 3 each of which may serve as the text base 3 of a retrieval object, a name of the text base 3, a name of a text file for storing a substance of the text base 3, a name of a relating information file for storing relating information regarding the text base 3, and information of a retrieval algorithm to be used;

(3c) a division number decision section for deciding, before retrieval of a text base 3 is started, a division number of the text base 3 based on size information of the text base 3, the information of the retrieval algorithms managed by the text base management section of paragraph (2c) above and the available memory amounts of the retrieval servers 1 managed by the retrieval server management section of paragraph (1c) above;

(4c) a retrieval server allocation section for selectively allocating, in accordance with the division number decided by the division number decision section of paragraph (3c) above and the available memory amounts of the retrieval servers 1, the text base 3 and the relating information of the text base 3 to the retrieval servers 1 in the descending order of the available memory amount; and (5c) a loading instruction section for sending, based on a result of the allocation by the retrieval server allocation section of paragraph (4c), a loading instruction for loading one of the divided parts 31 of the text base 3 and the relating information into a designated one of the retrieval servers 1 to those of the retrieval servers 1, to which retrieval is allocated by the retrieval server allocation section, together with the name of the text file, the name of the relating information file and the retrieval algorithm information managed by the text base management section of paragraph (2c) above.

Consequently, the retrieval management server 2 described above selectively allocates, in accordance with the division number of the text base 3 and the load situations of the retrieval servers 1, the text base 3 and the relating information of the text base 3 to the retrieval servers 1 in the ascending order of the load (in the descending order of the available memory amount), and provides retrieval algorithm information optimum for retrieval of the text base 3. Accordingly, the retrieval servers 1 can perform information retrieval processing normally at a high speed and efficiently in an optimum load situation.

In this instance, each of the retrieval servers 1 includes the following components:

(1d) a file access section for reading in, when the loading instruction is received from the retrieval management server 2, one of the divided parts 31 of the text base 3 and the corresponding relating information designated by the name of the text file and the name of the relating information file included in the loading instruction;

(2d) a retrieval section including a plurality of different retrieval algorithms for performing, when a retrieval request is received, information retrieval for the divided part 31 of the text base 3 read in by the file access section of paragraph (1d) above using one of the retrieval algorithms designated by the retrieval algorithm information from the retrieval management server 2; and (3d) a retrieval result send-out section for returning a result of the retrieval by the retrieval section of paragraph (2d) to a source of the retrieval request.

Consequently, each of the retrieval servers 1 performs information retrieval for the divided part 31 of the text base 3 read in using one of the retrieval algorithms designated by the retrieval algorithm information from the retrieval management server 2. Consequently, a retrieval algorithm optimum for the text base 3 of a retrieval object can be selectively used to perform information retrieval for the text base 3. Accordingly, upon information retrieval, retrieval processing can be performed in accordance with a retrieval condition such as whether importance should be attached to the accuracy of retrieval or to the speed of retrieval, and this contributes very much to the flexibility of the information retrieval processing.

The information retrieval system shown in FIG. 1 may further include a user management server for accepting a retrieval request from a user process, the user management server being constructed so as to inquire the retrieval management server 2 for information of a group of those of the retrieval servers 1 which are performing retrieval for the text base 3 of a retrieval object in response to the retrieval request from the user process and directly request the retrieval servers 1 in the group for actual retrieval based on a result of the inquiry.

In this instance, the user management server described above may include the following components:

(1e) a retrieval request acceptance section for accepting the retrieval request from the user process;

(2e) a retrieval server inquiry section for inquiring, in response to the retrieval request accepted by the retrieval request acceptance section of paragraph (1e) above, the retrieval management server 2 for the information of the group of those of the retrieval servers 1 to which retrieval processing for the text base 3 of a retrieval object of the retrieval request is allocated;

(3e) a retrieval request section for sending out, based on the information of the group of those of the retrieval servers 1 obtained from the retrieval management server 2 by the retrieval server inquiry section of paragraph (2e) above, a retrieval request directly to those of the retrieval servers 1 to which the retrieval processing for the text base 3 of a retrieval object of the retrieval request is allocated; and (4e) a retrieval result transfer section for merging responses to the retrieval request of the retrieval request section of paragraph (3e) above from the retrieval servers 1 and transferring the merged responses as a result of retrieval to the user process of the source of the retrieval request.

Consequently, with the information retrieval system described above, the user management server inquires, in response to the retrieval request from the user process, the retrieval management server 2 for the information of the group of those of the retrieval servers 1 which are performing information retrieval for the text base 3 of a retrieval object so that it normally effects actual retrieval request directly to those of the retrieval servers 1 which hold the text base 3 of a retrieval object. Accordingly, information retrieval processing can be performed without a delay in response to a retrieval request from any user process.

Further, in this instance, retrieval management server 2 may include the following components:

(1f) a retrieval server management section for managing, for each of the retrieval servers 1, retrieval server information including a name of the text base 3 for which the retrieval server 1 takes charge of retrieval and an amount of data of one of the divided parts 31 for which the retrieval server 1 takes charge of retrieval of the text base 3;

(2f) a loading information management section for managing loading information regarding a group of those of the retrieval servers 1 which are destinations of loading of the text base 3 of a retrieval object;

(3f) a text base management section for managing, for each of text bases 3 each of which may serve as the text base 3 of a retrieval object, a name of the text base 3, a name of a text file for storing a substance of the text base 3, and a name of a relating information file for storing relating information regarding the text base 3;

(4f) a division number decision section for deciding, when the text base 3 of a retrieval object of the inquiry request received from the user management server is not loaded as yet, a division number of the text base 3 based on size information of the text base 3 and load situations of the retrieval servers 1 obtained from the retrieval server information managed by the retrieval server management section of paragraph (1f) above;

(5f) a retrieval server allocation section for selectively allocating, in accordance with the division number decided by the division number decision section of paragraph (4f) above and the load situations of the retrieval servers 1, the text base 3 and the relating information of the text base 3 to the retrieval servers 1 in the ascending order of the load;

(6f) a loading instruction section for sending, based on a result of the allocation by the retrieval server allocation section of paragraph (5f) above, a loading instruction for loading one of the divided parts 31 of the text base 3 and the relating information into a designated one of the retrieval servers 1 to those of the retrieval servers 1, to which retrieval is allocated by the retrieval server allocation section, together with the name of the text file and the name of the relating information file obtained from the text base management section of paragraph (3f) above; and (7f) a loading information transfer section for transferring loading information regarding the group of those of the retrieval servers 1 to which the text base 3 of a retrieval object is allocated by the retrieval server allocation section of paragraph (5f) above as retrieval server group information to the user management server.

Consequently, also the retrieval management server 2 described above selectively allocates, in accordance with the division number of the text base 3 and the load situations of the retrieval servers 1, the text base 3 and the relating information of the text base 3 to the retrieval servers 1 in the ascending order of the load (in the descending order of the available memory amount). Accordingly, the retrieval servers 1 can perform information retrieval processing normally at a high speed in an optimum load situation.

In this instance, when a number of those of the retrieval servers 1 equal to the division number determined by the division number decision section of paragraph (4f) above cannot be allocated by the retrieval server allocation section of paragraph (5f) above, the division number of the text base 3 determined by the division number decision section of paragraph (4f) above is reconsidered, and processing by the retrieval server allocation section of paragraph (5f) above, the loading instruction section of paragraph (6f) above and the loading information transfer section of paragraph (7f) above, allocation processing of the text base 3 to the retrieval servers 1 and so forth are performed in accordance with the reconsidered division number.

Consequently, even if the size of the text base 3 of a retrieval object is large, the text base 3 (divided parts 31) can be allocated to the retrieval servers 1 with sizes decided taking the available memory amounts (or the load situations) of the retrieval servers 1 into consideration. Accordingly, such a situation that the speed in retrieval is decreased remarkably or retrieval becomes impossible because of an excessively large size of the text base 3 of a retrieval object does not occur.

Or, when the text base 3 of a retrieval object of the inquiry request received from the user management server is loaded already, the loading information transfer section of paragraph (7f) above transfers the loading information regarding the text base 3 of a retrieval object managed by the loading information management section of paragraph (2f) above (information of the group of those retrieval servers which hold the text base of a retrieval object) as retrieval server group information to the user management server.

Consequently, the retrieval management server 2 need not specify those retrieval servers 1 which hold the text base 3 of a retrieval object newly, and the processing time until an actual retrieval request based on a result of an inquiry is issued to the retrieval servers 1 can be reduced remarkably to achieve high speed operation.

Further, when the text base 3 of a retrieval object of the inquiry request received from the user management server is loaded already as described above, the retrieval management server 2 may process in the following manner.

In particular, the division number decision section of paragraph (4f) above decides a division number of the text base 3 based on size information of the text base 3 and load situations of the retrieval servers 1 obtained from the retrieval server information managed by the retrieval server management section of paragraph (1f) above, and when those of the retrieval servers 1 whose load is lighter than a predetermined value can be allocated by a number equal to the division number decided by the division number decision section of paragraph (4f) above from among the plurality of retrieval servers 1, the retrieval server allocation section of paragraph (5f) above selects the division number of those of the retrieval servers 1 whose load is lighter than the predetermined value and allocates the text base 3 and the relating information to the selected retrieval servers 1.

Then, the loading instruction section of paragraph (5a) above sends, based on a result of the allocation by the retrieval server allocation section of paragraph (5f) above, a loading instruction for loading the divided parts 31 of the text base 3 and the relating information into the retrieval servers 1 of the destinations of allocation to the retrieval servers 1 of the destinations of allocation together with the name of the text file and the name of the relating information file obtained from the text base management section of paragraph (3f) above and the loading information transfer section of paragraph (7f) above transfers loading information regarding the group of those of the retrieval servers 1 to which the text base 3 is allocated by the retrieval server allocation section of paragraph (5f) above as retrieval server group information to the user management server.

However, when those of the retrieval servers 1 whose load is lighter than the predetermined value cannot be allocated by a number equal to the division number determined by the division number decision section of paragraph (4f) above from among the plurality of retrieval servers 1, the loading information transfer section of paragraph (7f) above transfers the loading information of the text base 3 of a retrieval object managed by the loading information management section of paragraph (2f) as retrieval server group information to the user management server.

In short, when the text base 3 of a retrieval object for which the inquiry request has been received is loaded already, if those of the retrieval servers 1 whose available memory amount is larger (or whose load is lighter) than a predetermined value can be allocated by a number equal to the division number of the text base 3 of a retrieval object, then the retrieval management server 2 dispersedly allocates the loaded text base 3 of a retrieval object to the thus allocated retrieval servers 1 whose available memory amount is larger (or whose load is lighter) than the predetermined value. Accordingly, information retrieval processing by the retrieval servers 1 can be performed at a high speed.

In this instance, each of the retrieval servers 1 includes the following components:

(1g) a file access section for reading in, when the loading instruction is received from the retrieval management server 2, one of the divided parts 31 of the text base 3 and the corresponding relating information designated by the name of the text file and the name of the relating information file included in the loading instruction;

(2g) a retrieval section for performing, when a retrieval request is received from the user management server, information retrieval for the divided part 31 of the text base 3 read in by the file access section of paragraph (1g) above; and (3g) a retrieval result send-out section for returning a result of the retrieval by the retrieval section of paragraph (2g) above to the user management server.

Consequently, each of the retrieval servers 1 described above reads in one of the divided parts 31 of the text base 3 and the corresponding relating information designated by the name of the text file and the name of the relating information file included in the loading instruction from the retrieval management server 2 and performs information retrieval, or in short, performs information retrieval only for the divided part 31 of the text base 3 allocated by the retrieval management server 2 so as to take charge of retrieval of it. Accordingly, such parallel and independent processing of information retrieval as described above can be realized readily, and information retrieval for the text base 3 of a retrieval object can be performed at a very high speed.

Otherwise, the retrieval management server 2 described above may include the following components:

(1h) a retrieval server management section for managing, for each of the retrieval servers 1, retrieval server information including a name of the text base 3 for which the retrieval server 1 takes charge of retrieval, an amount of data of one of the divided parts 31 for which the retrieval server 1 takes charge of retrieval of the text base 3, and an available memory amount;

(2h) a loading information management section for managing loading information regarding a group of those of the retrieval servers 1 which are destinations of loading of the text base 3 of a retrieval object;

(3h) a text base management section for managing, for each of text bases 3 each of which may serve as the text base 3 of a retrieval object, a name of the text base 3, a name of a text file for storing a substance of the text base 3, a name of a relating information file for storing relating information regarding the text base 3, and information of a retrieval algorithm to be used;

(4h) a division number decision section for deciding, when the text base 3 of a retrieval object of the inquiry request received from the user management server is not loaded as yet, a division number of the text base 3 based on size information of the text base 3, the information of the retrieval algorithms managed by the text base management section of paragraph (3h) above and the available memory amounts of the retrieval servers 1 managed by the retrieval server management section of paragraph (1h) above;

(5h) a retrieval server allocation section for selectively allocating, in accordance with the division number decided by the division number decision section of paragraph (4h) above and the available memory amounts of the retrieval servers 1, the text base 3 and the relating information of the text base 3 to the retrieval servers 1 in the descending order of the available memory amount;

(6h) a loading instruction section for sending, based on a result of the allocation by the retrieval server allocation section of paragraph (5h) above, a loading instruction for loading one of the divided parts 31 of the text base 3 and the relating information into a designated one of the retrieval servers 1 to those of the retrieval servers 1, to which retrieval is allocated by the retrieval server allocation section, together with the name of the text file and the name of the relating information file obtained from the text base management section of paragraph (3h) above; and (7h) a loading information transfer section for transferring loading information regarding the group of those of the retrieval servers to which the text base 3 is allocated by the retrieval server allocation section of paragraph (5h) above as retrieval server group information to the user management server.

Consequently, also the retrieval management server 2 described above selectively allocates, in accordance with the division number of the text base 3 and the load situations of the retrieval servers 1, the text base 3 and the relating information of the text base 3 to the retrieval servers 1 in the ascending order of the load (in the descending order of the available memory amount), and provides retrieval algorithm information optimum for retrieval of the text base 3. Accordingly, the retrieval servers 1 can perform information retrieval processing normally at a high speed and efficiently in an optimum load situation.

Also in this instance, when a number of those of the retrieval servers 1 equal to the division number determined by the division number decision section of paragraph (4h) above cannot be allocated by the retrieval server allocation section of paragraph (5h) above, the division number of the text base 3 determined by the division number decision section of paragraph (4h) above is reconsidered, and processing by the retrieval server allocation section of paragraph (5h) above, the loading instruction section of paragraph (6h) above and the loading information transfer section of paragraph (7h) above is performed in accordance with the reconsidered division number.

Consequently, also in this instance, even if the size of the text base 3 of a retrieval object is large, the retrieval management server 2 can allocate the text base 3 (divided parts 31) to the retrieval servers 1 with sizes decided taking the available memory amounts (or the load situations) of the retrieval servers 1 into consideration. Accordingly, such a situation that the speed in retrieval is decreased remarkably or retrieval becomes impossible because of an excessively large size of the text base 3 of a retrieval object does not occur.

On the other hand, when the text base 3 of a retrieval object of the inquiry request received from the user management server is loaded already, the loading information transfer section of paragraph (7h) above transfers the loading information regarding the text base 3 of a retrieval object managed by the loading information management section of paragraph (2h) above as retrieval server group information to the user management server.

Consequently, also in this instance, those retrieval servers 1 which hold the text base 3 of a retrieval object need not be specified newly, and the processing time until an actual retrieval request based on a result of an inquiry is issued to the retrieval servers 1 can be reduced remarkably to achieve high speed operation.

Alternatively, when the text base 3 of a retrieval object of the inquiry request received from the user management server is loaded already, the retrieval management server 2 may perform the following processing.

In particular, the division number decision section of paragraph (4h) above decides a division number of the text base 3 based on size information of the text base 3, the retrieval algorithm information managed by the text base management section of paragraph (3h) above and the available memory amounts of the retrieval servers 1 managed by the retrieval server management section of paragraph (1h) above.

Then, when those of the retrieval servers 1 whose available memory amount is larger than a predetermined value can be allocated by a number equal to the division number decided by the division number decision section of paragraph (4h) above from among the plurality of retrieval servers 1, the retrieval server allocation section of paragraph (1h) above selects the division number of those of the retrieval servers 1 whose available memory amount is larger than the predetermined value and allocates the text base 3 and the relating information to the selected retrieval servers 1, whereafter the loading instruction section of paragraph (6h) above sends, based on a result of the allocation by the retrieval server allocation section of paragraph (1h) above, a loading instruction for loading the divided parts 31 of the text base 3 and the relating information into the retrieval servers 1 of the destinations of allocation to the retrieval servers 1 of the destinations of allocation together with the name of the text file, the name of the relating information file and the retrieval algorithm information obtained from the text base management section of paragraph (3h) above and the loading information transfer section of paragraph (7h) above transfers loading information regarding the group of those of the retrieval servers 1 to which the text base 3 is allocated by the retrieval server allocation section of paragraph (1h) above as retrieval server group information to the user management server.

However, when those of the retrieval servers 1 whose available memory amount is larger than the predetermined value cannot be allocated by a number equal to the division number determined by the division number decision section of paragraph (4h) above from among the plurality of retrieval servers 1, the loading information transfer section of paragraph (7h) above transfers the loading information of the text base 3 of a retrieval object managed by the loading information management section of paragraph (2h) as retrieval server group information to the user management server.

In short, when the text base 3 of a retrieval object for which the inquiry request has been received is loaded already, only if those of the retrieval servers 1 whose available memory amount is larger (or whose load is lighter) than a predetermined value can be allocated by a number equal to the division number of the text base 3 of a retrieval object from among the plurality of retrieval servers 1, the retrieval management server 2 described above dispersedly allocates the loaded text base 3 of a retrieval object to the thus allocated retrieval servers 1 whose available memory amount is larger (or whose load is lighter) than the predetermined value and provides retrieval algorithm information optimum for retrieval of the text base 3. Accordingly, information retrieval processing by the retrieval servers 1 can be performed at a high speed and efficiently.

In this instance, each of the retrieval servers 1 includes the following elements:

(1i) a file access section for reading in, when the loading instruction is received from the retrieval management server 2, one of the divided parts 31 of the text base 3 and the corresponding relating information designated by the name of the text file and the name of the relating information file included in the loading instruction;

(2i) a retrieval section including a plurality of different retrieval algorithms for performing, when a retrieval request is received from the user management server, information retrieval for the divided part 31 of the text base 3 read in by the file access section of paragraph (1i) above using one of the retrieval algorithms designated by the retrieval algorithm information from the retrieval management server 2; and (3i) a retrieval result send-out section for returning a result of the retrieval by the retrieval section of paragraph (2i) above to the user management server.

Consequently, each of the retrieval servers 1 performs information retrieval for the divided part 31 of the text base 3 read in using one of the retrieval algorithms designated by the retrieval algorithm information from the retrieval management server 2, and consequently, a retrieval algorithm optimum for the text base 3 of a retrieval object can be selectively used to perform information retrieval for the text base 3. Accordingly, upon information retrieval, retrieval processing can be performed in accordance with a retrieval condition such as whether importance should be attached to the accuracy of retrieval or to the speed of retrieval, and this contributes very much to the flexibility of the information retrieval processing.

b. Embodiment of the Invention b1. General Construction of the Information Retrieval System Referring now to FIG. 2, there is shown in block diagram a construction of an information retrieval system according to a preferred embodiment of the present invention. The information retrieval system shown includes a plurality of user management servers 4, a retrieval management server 5, a plurality of retrieval servers 6, and a file system (data base) 7 which holds a plurality of text bases (TB) 8.

Figure 2:
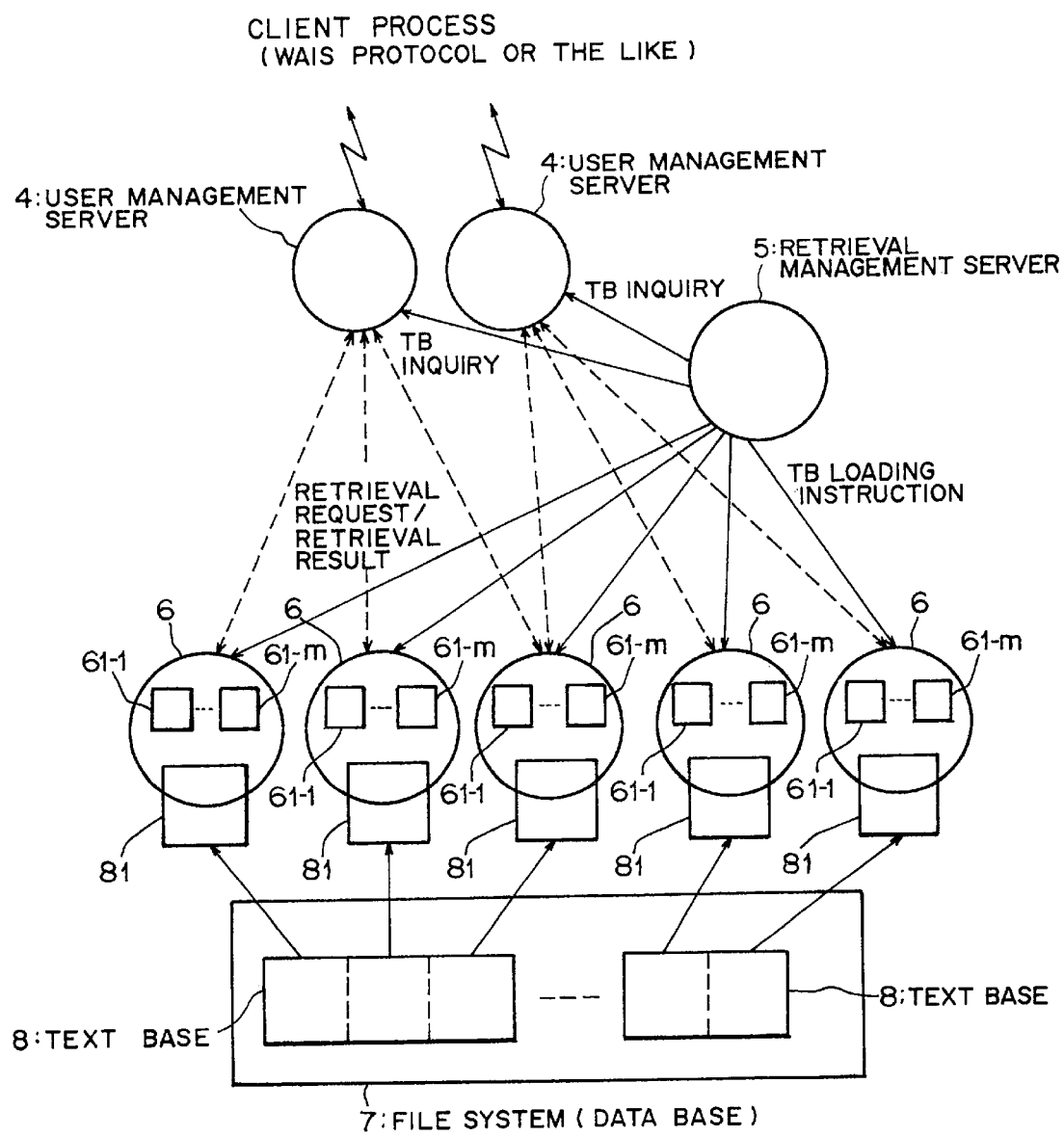
FIG. 2 is a block diagram showing a construction of an information retrieval system according to a preferred embodiment of the present invention.

It is to be noted that, while the information retrieval system shown in FIG. 2 is presumably constructed such that each server of the servers (user management servers 4, retrieval management server 5 and retrieval servers 6) is constructed dispersedly as a plurality of processor elements (PEs), some of the servers may be constructed as a same processor element. Further, those servers may individually be provided by numbers greater than those shown in FIG. 2.

Each of the user management servers 4 collectively manages utilizers (users) of the system and issues a retrieval request to the retrieval servers 6 in response to a retrieval request from a user for any of the text bases 8 held in the file system 7. Specifically, however, in the present embodiment, each of the user management servers 4 is constructed such that it accepts a retrieval request transmitted thereto from a client process (user process) in accordance with a communication protocol such as a WAIS (Wide Area Information Server) protocol, inquires the retrieval management server 5, which will be hereinafter described, to acquire information of those retrieval servers (group) 6 which retrieve for the text base 8 in response to the accepted retrieval request, and directly performs actual retrieval requests to those retrieval servers 6 in accordance with the acquired inquiry result.

The retrieval management server 5 is provided to manage operation of the retrieval servers 6. Here, the retrieval management server 5 is constructed such that it divides one of the text bases 8 held in the file system 7 and serving as an object of retrieval into divided parts (divided text bases) 81 and divides relating data regarding the text base 8 such as, for example, index information which will be hereinafter described and allocates the divided parts 81 and the corresponding relating data in sets to some or all of the retrieval servers 6.

For example, in FIG. 2, each of the text bases 8 and relating data regarding the text base 8 are individually divided by the retrieval management server 5, and the resulting divided parts 81 and the relating data corresponding to the divided parts 81 are allocated to corresponding ones of the retrieval servers 6.

Further, each of the retrieval servers 6 actually performs information retrieval of a text base 8. Here, each of the retrieval servers 6 includes a plurality of different retrieval engines (retrieval algorithms) 61-1 to 61-m (m is a natural number) which will be hereinafter described with reference to FIG. 9, and the retrieval servers 6 effect information retrieval for the divided parts 81 allocated thereto by the retrieval management server 5 described above parallelly to and independently of each other each using one of the retrieval engines 61-1 to 61-m which is designated by the retrieval management server 5.

Figure 3:
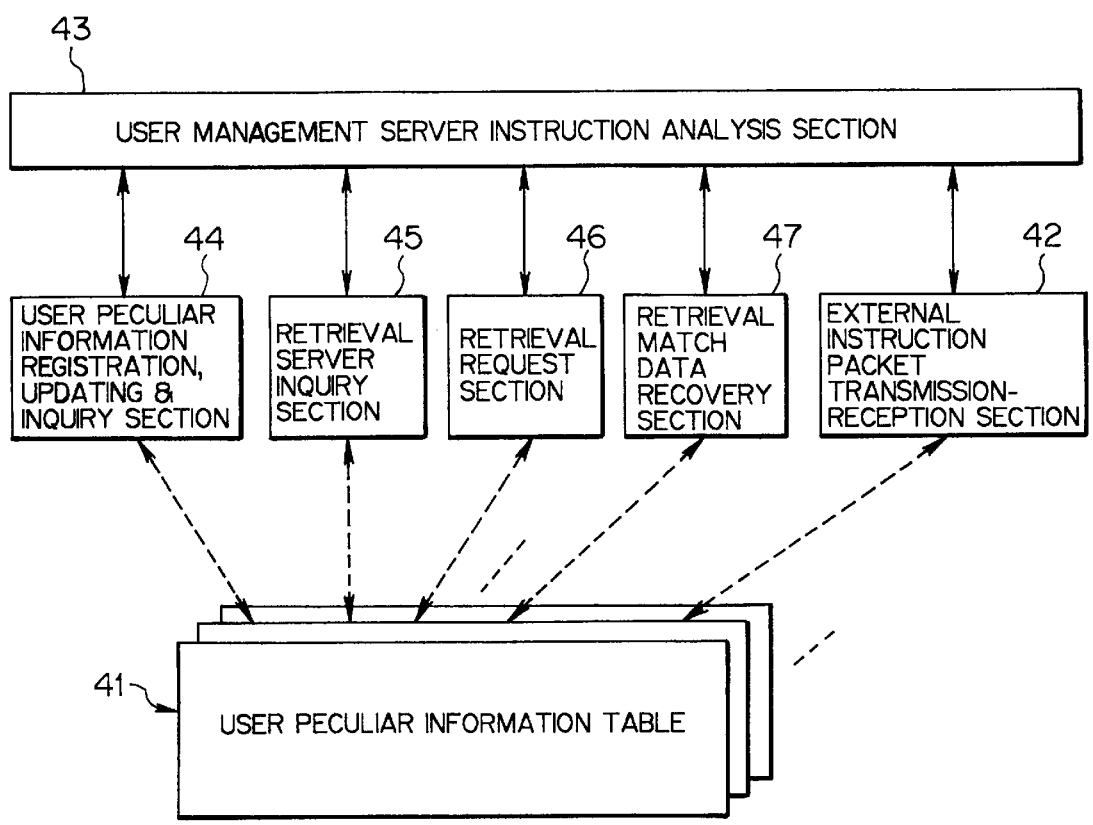
FIG. 3 is a block diagram showing a detailed construction of a user management server of the information retrieval system of FIG. 2.

FIG. 3 shows in block diagram a detailed construction of each of the user management servers 4 described above. Referring to FIG. 3, each of the user management servers 4 includes a plurality of user peculiar information tables 41 produced for individual users who utilize the system, an external instruction packet transmission-reception section 42, a user management server instruction analysis section 43, a user peculiar information registration, updating and inquiry section 44, a retrieval server inquiry section 46, a retrieval request section 46 and a retrieval match data recovery section 47.

Figure 4:
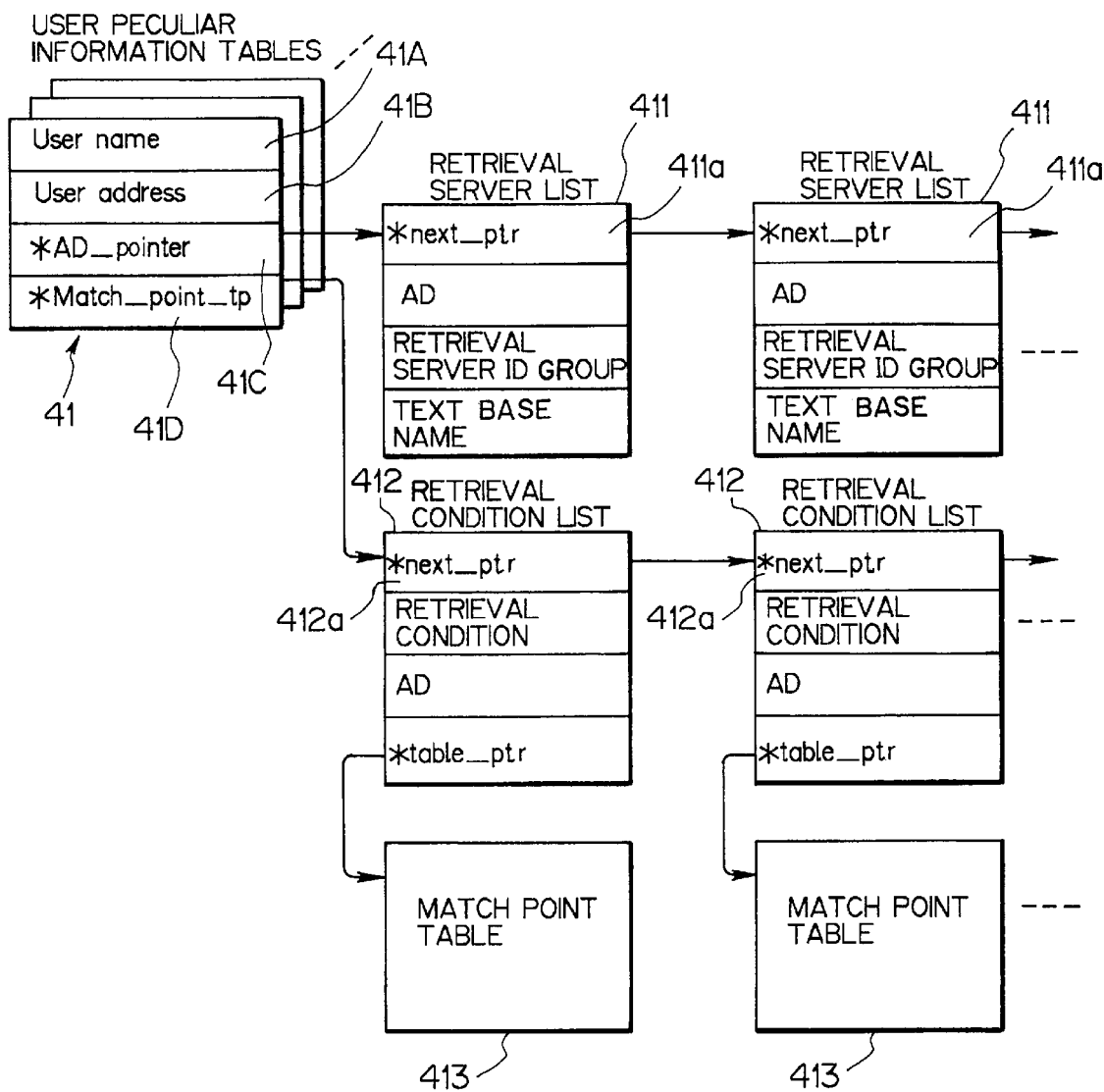
FIG. 4 is a diagrammatic view showing an example of a user peculiar information table used in the information retrieval system of FIG. 2.

The user peculiar information tables 41 are provided to manage, for individual users, information such as a user name, an access (retrieval object) text base name and an access descriptor (AD). The user peculiar information tables 41 have such a list structure as shown, for example, in FIG. 4 in which various peculiar information such as a user name (User name) 41A, a user address (User address) 41B indicating an accommodation position of a user terminal, an access descriptor pointer (*AD pointer) 41C and a match point table pointer (*Match point tp) 41D is stored.

It is to be noted that the access descriptor pointer 41C is a pointer which indicates a top address of a retrieval server list 411 produced for each of the text bases 8 of an object of retrieval, and stores a top address of a retrieval server list 411 to be produced newly successively into a next list referring pointer (*next ptr) 411a of another retrieval server list 411 produced already to successively link such retrieval server lists 411 to each other so that all of the retrieval server lists 411 can be referred to from the access descriptor pointer 41C.

The match point table pointer 41D is a pointer which indicates a top address of a retrieval condition list 412 produced for each retrieval condition (a keyword to be retrieved or the like), and stores a top address of a retrieval condition list 412 to be produced newly into a next list referring pointer (*next ptr) 412a of another retrieval condition list 412 produced already to successively link such retrieval condition lists 412 to each other and further stores a top address of a match point table 413, which stores address information of data which match with a retrieval condition, to a table pointer (*table ptr) of a corresponding retrieval condition list 412 to successively link such match point tables 413 so that all of the retrieval condition lists 412 and the match point tables 413 can be referred to from the match point table pointer 41D.

Referring back to FIG. 3, the external instruction packet transmission-reception section (retrieval request acceptance section) 42 receives or transmits an instruction packet communicated upon communication with an external apparatus such as a client (user) process to accept a retrieval request transmitted thereto as the instruction packet from the user process. The user management server instruction analysis section 43 analyzes various instructions such as a retrieval request from an instruction packet communicated by means of the external instruction packet transmission-reception section 42.

The user peculiar information registration, updating and inquiry section 44 performs production of a user peculiar information table 41 and registration, updating, inquiry and so forth of various information in any user peculiar information table 41 in response to a result of an analysis by the user management server instruction analysis section 43.

The retrieval server inquiry section 45 inquires, in response to a retrieval request from a user accepted through the external instruction packet transmission-reception section 42 and the user management server instruction analysis section 43, the retrieval management server 5 for retrieval server group information (an ID group of retrieval servers 6) to which retrieval processing for a text base (group) 8 for which retrieval has been requested is allocated. Consequently, information (retrieval server group information) of in which one of the retrieval servers 6 a text base 8 of an object of retrieval designated by a user is held can be acquired by the retrieval server inquiry section 45.

The retrieval request section 46 sends out, in accordance with retrieval server group information obtained from the retrieval management server 5 by the retrieval server inquiry section 45, a retrieval request directly to those retrieval servers 6 to which retrieval processing for a text base 8 for which a retrieval request has been issued is allocated. Results of the retrieval by those retrieval servers 6 (address information from those retrieval servers 6) performed in response to a retrieval request of the retrieval request section 46 are stored as match point data into a match point table 413.

The retrieval match data recovery section 47 merges, in response to a retrieval match data recovery request from a user accepted through the external instruction packet transmission-reception section 42 and the user management server instruction analysis section 43, data read out from those retrieval servers 6 (data corresponding to match point data of the match point table 413 in a user peculiar information table 41) and transfers the merged data to a user process of a source of a retrieval request through the external instruction packet transmission-reception section 42.

Figure 5:
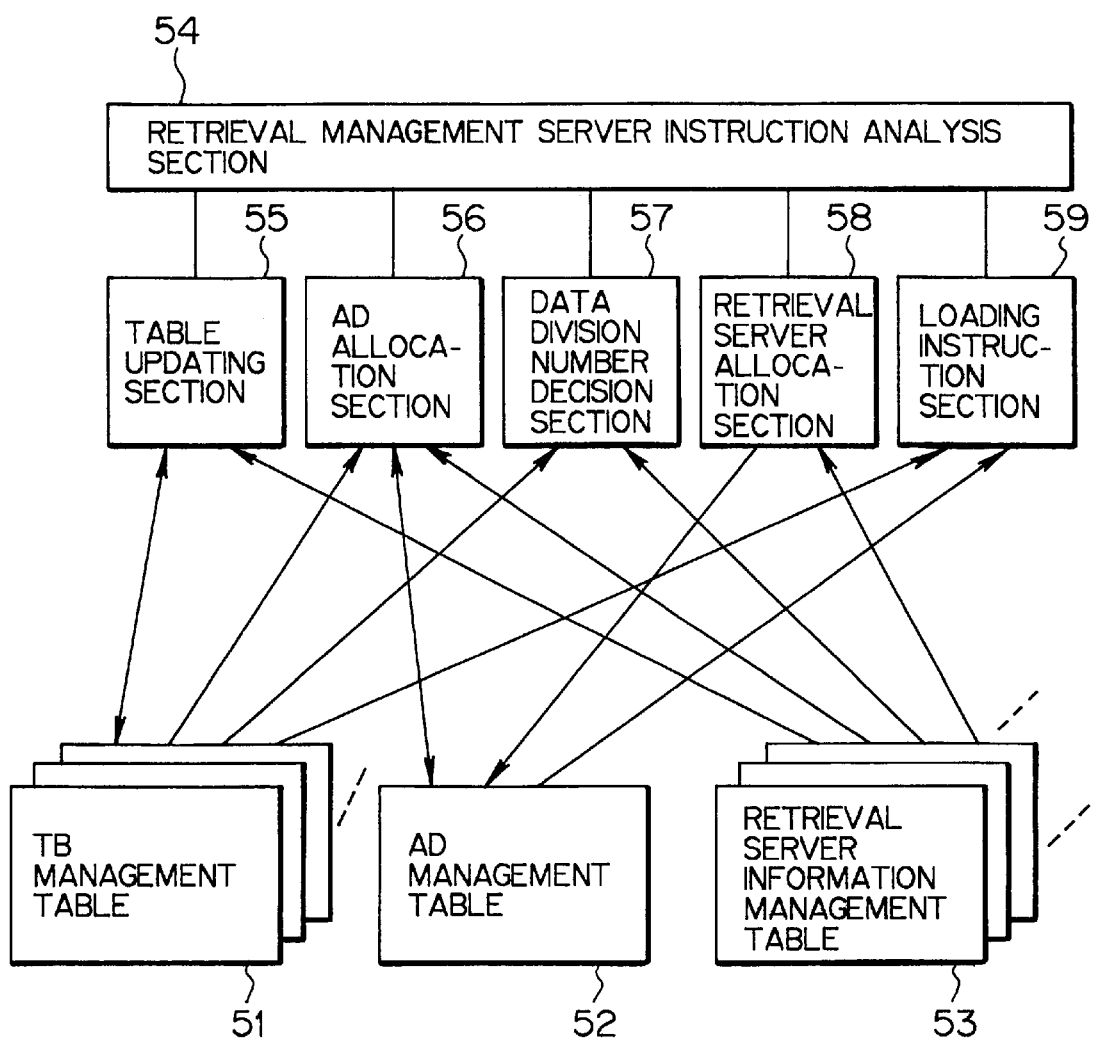
FIG. 5 is a block diagram showing a detailed construction of a retrieval management server of the information retrieval system of FIG. 2.

Referring now to FIG. 5, there is shown in block diagram a detailed construction of the retrieval management server 5 described hereinabove. The retrieval management server 5 includes a text base (TB) management table 51 produced for each of the text bases 8, an access descriptor (AD) management table 52, a retrieval server information table 53 produced for each of the retrieval servers 6, a retrieval management server instruction analysis section 54, a table updating section 55, an access descriptor (AD) allocation section 56, a data division number decision section 57, a retrieval server allocation section 58 and a loading instruction section 59. Basically, the retrieval management server 5 operates based on the tables 51 to 53.

The text base management tables (text base management sections) 51 manage, for the individual text bases 8, text base names and original data and relating data (index information and so forth) of the text bases, and are used when a loading instruction of divided parts 81 of a text base 8 is to be issued to the retrieval servers 6 as hereinafter described.

Figure 6:
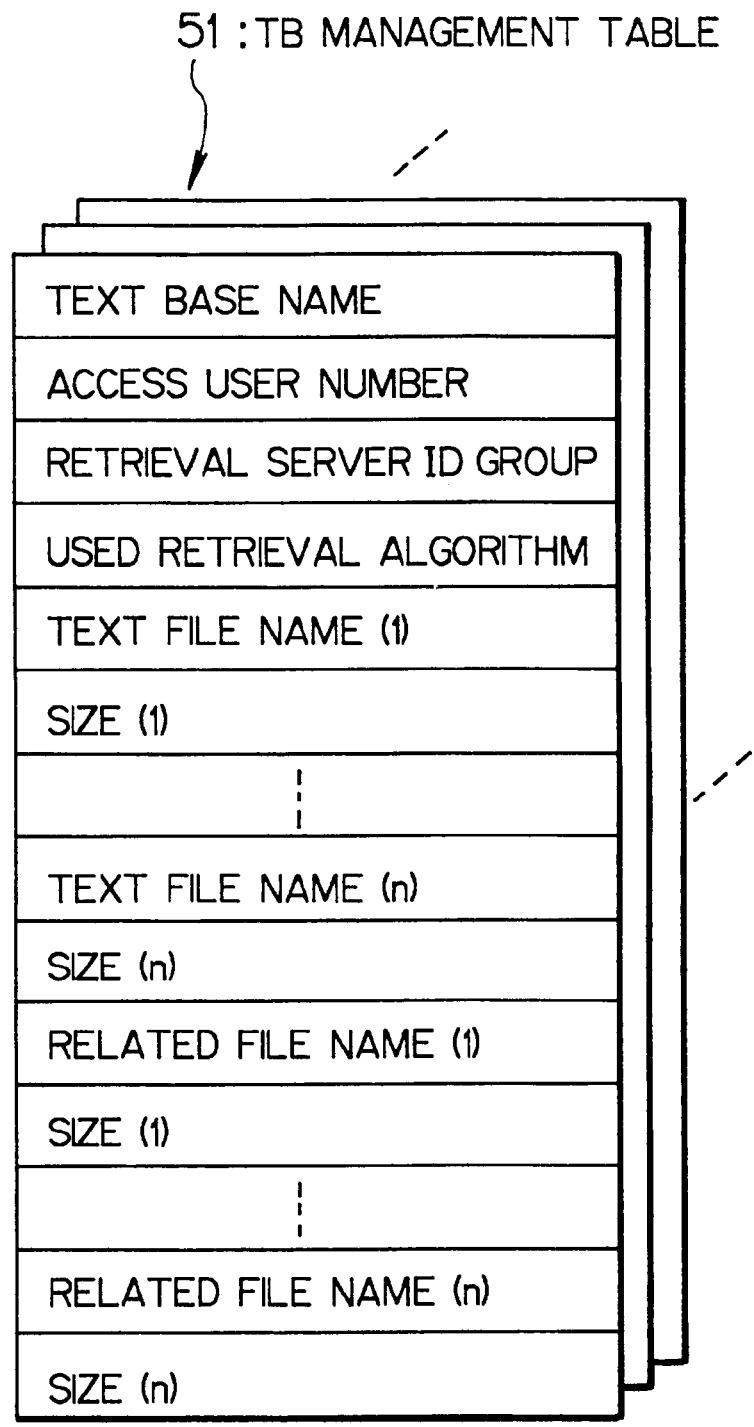
FIG. 6 is a diagrammatic view showing an example of a text base (TB) management table used in the information retrieval system of FIG. 2.

More particularly, each of the text base management tables 51 has a list structure which stores, for example, as shown in FIG. 6, a text base name, text file names (1 to n: n is a division number of a text base 8) which hold divided parts 81 of the text base 8, size information (1 to n) of the divided parts 81, an access user number, a retrieval server ID group, relating file names (1 to n) for storing relating data such as indices regarding the text bases 8, size information (1 to n) of the relating files, one of the retrieval engines (retrieval algorithms) 61-1 to 61-m to be used for the text base 8, and so forth.

It is to be noted that the access user number is a total number of users which are retrieving using the text base 8 at present; the retrieval server ID group is an ID group of those retrieval servers 6 which take charge of retrieval of the text base; and the available memory amount is a remaining memory amount of a retrieval server 6 which varies in accordance with allocation/release of the text base 8.

Figure 7:
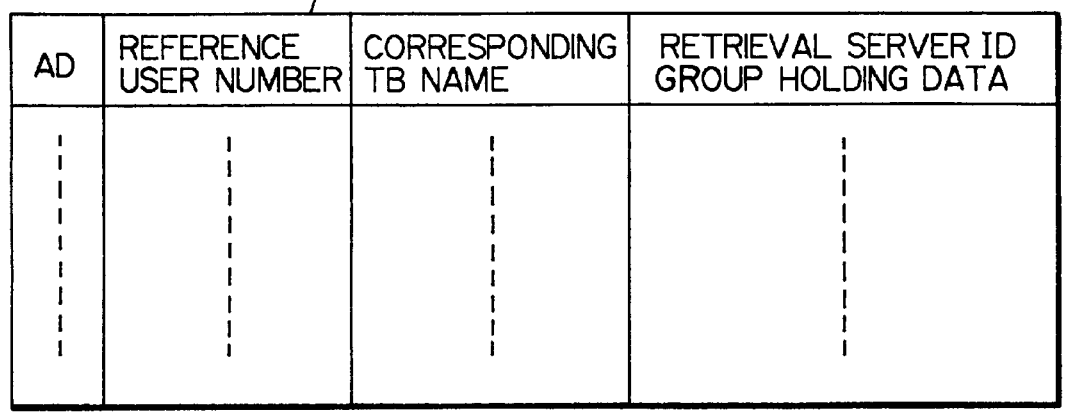
FIG. 7 is a diagrammatic view showing an example of an access discriminator (AD) management table used in the information retrieval system of FIG. 2.
Figure 8:
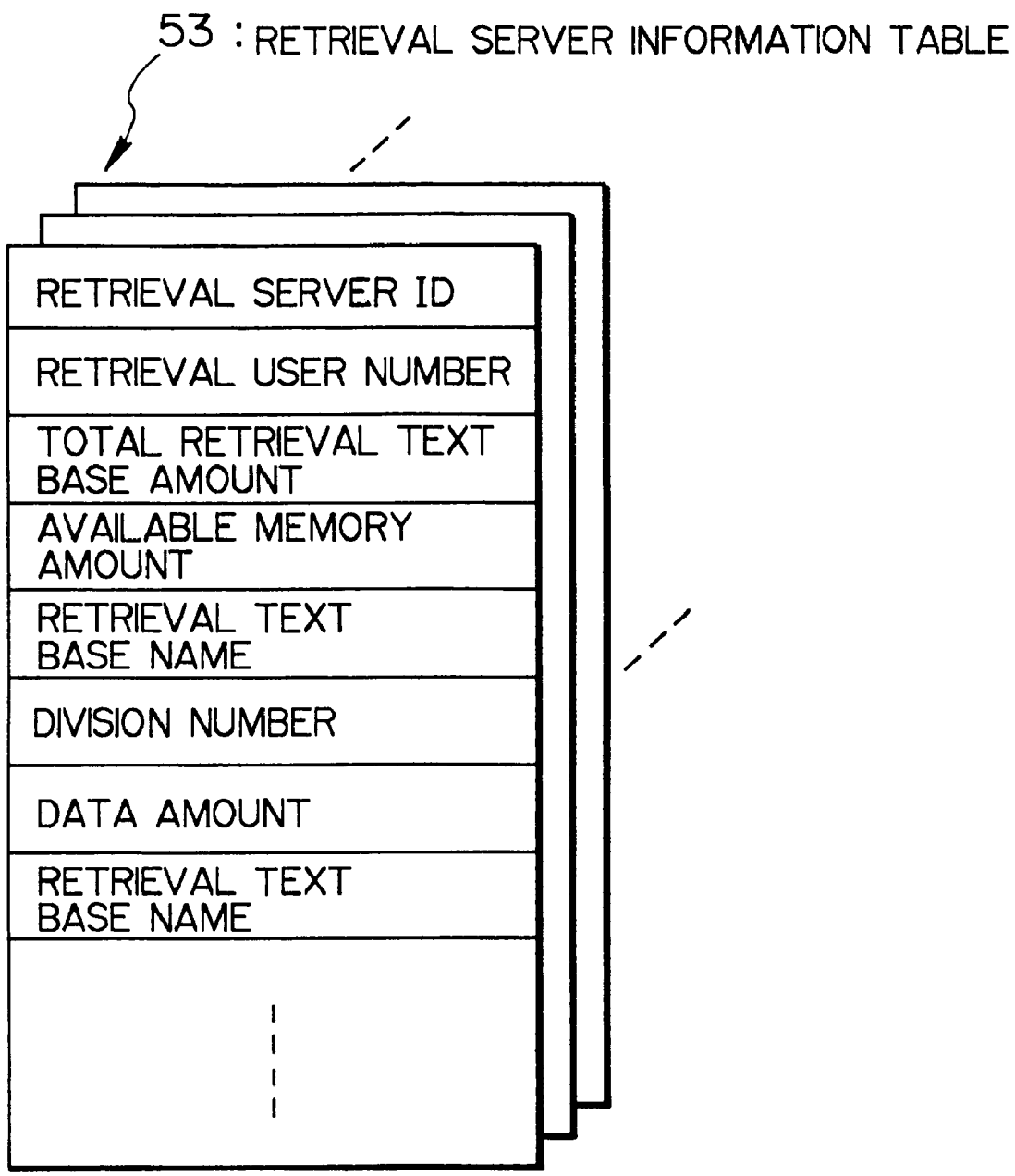
FIG. 8 is a diagrammatic view showing an example of a retrieval server information table used in the information retrieval system of FIG. 2.

The access descriptor management table (loading information management section) 52 manages, as seen, for example, in FIG. 7, for each access descriptor, a corresponding reference user number, a text base name and loading information (an ID group of retrieval servers 6 and so forth) regarding retrieval servers (group) 6 in which a text base 8 of a retrieval object is loaded (held). Each of the retrieval server information tables (retrieval server management sections) 53 manages retrieval server information including, for example, as seen in FIG. 8, an ID of a retrieval server 6, a retrieval user number, a total retrieval text base amount, an available memory amount, a name of a text base which takes charge of retrieval, and a data amount of a divided part 81 of the text base 8 which takes charge of retrieval. Consequently, a remaining memory amount (or load situation) of each retrieval server 6 can be discriminated based on those informations.

It is to be noted that the retrieval user number is a number of users who is retrieving using the retrieval server 6, and the total retrieval text base amount is a sum total of text base amounts with which the retrieval server 6 takes charge of retrieval at present.

Referring back to FIG. 5, the retrieval management server instruction analysis section 54 analyzes various instructions from an instruction packet communicated upon communication with an external apparatus. The table updating section 55 performs updating and so forth of various information of the text base management tables 51, the access descriptor management table 52 and the retrieval server information table 53. The access descriptor allocation section 56 performs allocation/acquisition of information corresponding to an access descriptor of the access descriptor management table 52 based on various information managed by the text base management tables 51 and the retrieval server information table 53. For example, if an inquiry request for a new text base 8 is received from a user management server 4, then the access descriptor allocation section 56 allocates a new access descriptor, acquires a new region for the access descriptor in the access descriptor management table 52 and sets various parameters (refer to FIG. 7).

The data division number decision section 57 decides, when a retrieval object text base 8 for which an inquiry request has been received from a user management server 4 is not loaded as yet, a division number of the text base 8 based on size information of the text base 8, applicable retrieval algorithm information managed by the text base management tables 51 and available memory amounts of the retrieval servers 6 managed by the retrieval server information tables 53. The retrieval server allocation section 58 allocates, in accordance with the division number decided by the data division number decision section 57 and the available memory amounts (or load situations) of the retrieval servers 6, the text base 8 and its relating data to the retrieval servers 6 in the descending order of the available memory amount (or in the ascending order of the load situation).

The loading instruction section 59 sends, based on a result of the allocation by the retrieval server allocation section 58, a loading instruction for loading the divided parts of the text base 8 and its relating data to those retrieval servers 6 of the destinations of allocation to the retrieval servers 6 of the destinations of allocation together with text file names and relating file names obtained from the text base management table 51. In the present embodiment, the loading instruction section 59 has an additional function as a loading information transfer section for transferring loading information regarding those retrieval servers (group) 6 to which the divided parts 81 of the retrieval object text bases 8 are allocated as information of a retrieval server group which actually performs retrieval for the divided parts 81 to a user management server 4.

In particular, for example, if a text base 8 for which an inquiry request has been received from a user management server 4 (a text base 8 to which a request for retrieval has been issued from a user) is not loaded in the retrieval servers 6 at this point of time, a division number of the text base 8 is decided based on the magnitude of the text base 8, applicable retrieval algorithm information, available memory amounts (or load situations) of the retrieval servers 6 and so forth, and then, based on the division number, a necessary number of retrieval servers 6 are selected from among the retrieval servers 6. Then, the thus selected retrieval servers 6 are loaded only with corresponding parts of the information (divided parts 81 of the retrieval object text bases 8), whereafter the loading information (the ID of those retrieval servers 6 to which retrieval is allocated and so forth) is returned to the user management server 4 of the source of the inquiry.

It is to be noted that, when a number of retrieval servers 6 equal to the division number decided by the data division number decision section 57 as described above cannot be allocated by the retrieval server allocation section 58, the retrieval management server 5 reconsiders the division number of those text bases 8 decided by the data division number decision section 57, and processing by the retrieval server allocation section 58 and the loading instruction section 59 is performed again in accordance with a new division number decided by the reconsideration.

Further, while, in the present embodiment, a retrieval object text base 8 whose retrieval has been requested by a user has already been loaded into the retrieval servers 6, loading information regarding the retrieval object text base 8 registered already in and managed by the access descriptor management table 52 is transferred as retrieval server group information to the user management server 4 by the loading instruction section 59, when the retrieval object text base 8 has already been loaded already, if those retrieval servers 6 which have available memory amounts larger than a predetermined value (or which have loads lighter than a predetermined value) can be allocated as hereinafter described, then the retrieval object text base 8 may be allocated also to the other retrieval servers 6 allocated in this manner.

Figure 9:
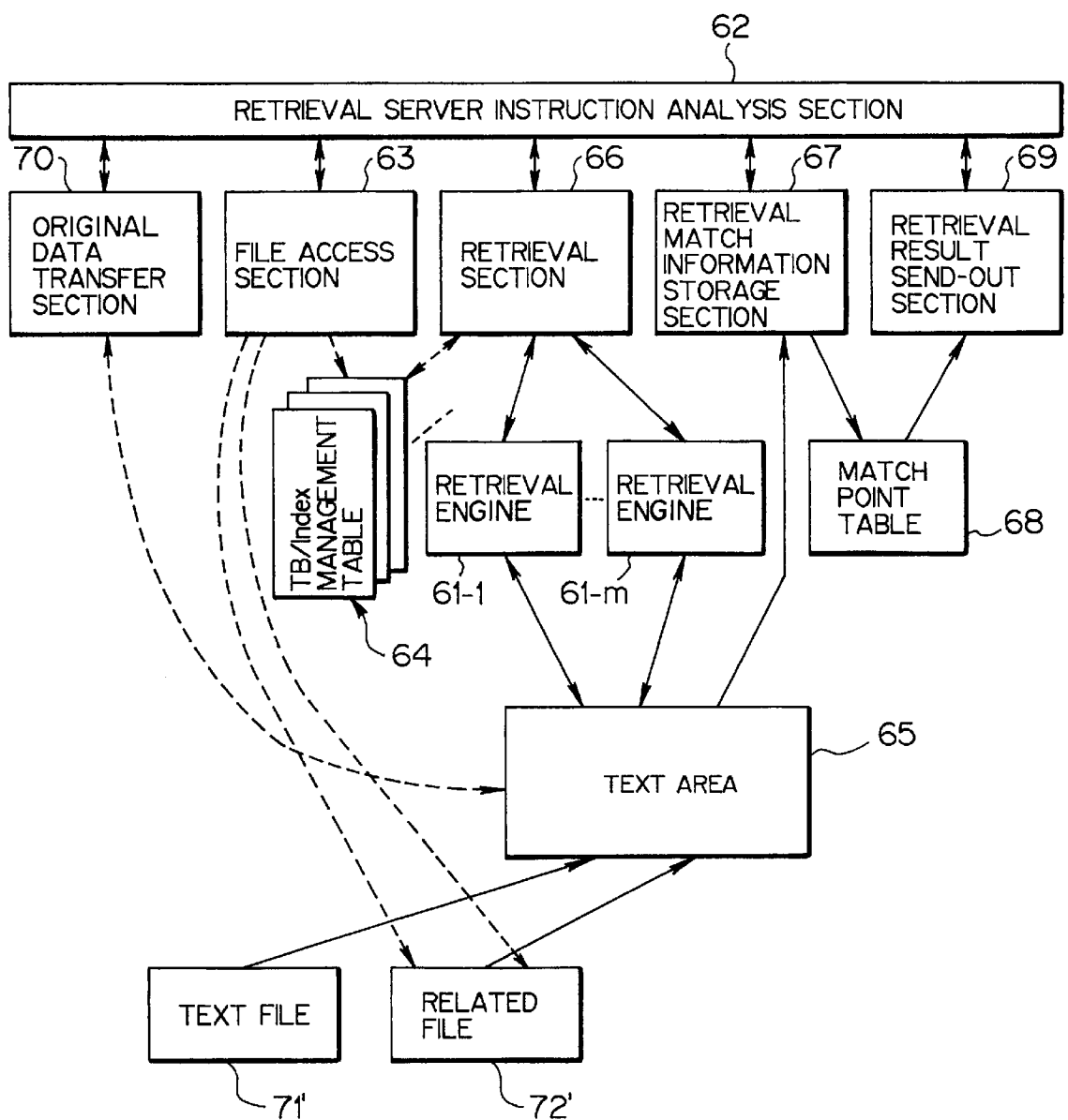
FIG. 9 is a block diagram showing a detailed construction of a retrieval server used in the information retrieval system of FIG. 2.

Referring now to FIG. 9, there is shown in block diagram a detailed construction of each of the retrieval servers 6 described hereinabove. Each of the retrieval servers 6 shown includes, in addition to a plurality of different retrieval engines 61-1 to 61-m described hereinabove with reference to FIG. 2, a retrieval server instruction analysis section 62, a file access section 63, an text base/index (TB/Index) management table 64 produced for each access descriptor, a text region 65 cached on a memory of a processor element in which a retrieval server 6 is present, a retrieval section 66, a retrieval match information storage section 67, a match point table 68, a retrieval result send-out section 69 and an original data transfer section 70.

The retrieval engines 61-1 to 61-m individually effect retrieval using a retrieval method (retrieval algorithm) based on such conditions as whether importance upon information retrieval should be attached to the retrieval accuracy or the retrieval speed. The retrieval section 66 which will be hereinafter described selects one of the retrieval engines 61-1 to 61-m which is to be used upon information retrieval.

The retrieval server instruction analysis section 62 analyzes a process to be performed from an instruction packet received from a user management server 4. The file access section 63 reads, when a loading instruction is received from the retrieval management server 5, a text file 71' (a file in which the substance of a divided part 81 of a text base 8 is stored) and a relating file 72' in which relating data (index information and so forth) to the text file 71' are stored, designated by a text file name and a relating file name included in the loading instruction into the text region 65.

Each of the text base/index management tables 64 manages address information in the text region 65 of the text file 71' and the relating file 72' stored in the text region 65 by the file access section 63 as described above and information of an available memory amount (remaining memory amount) of the retrieval server 6 and those of the retrieval engines 61-1 to 61-m to be used upon information retrieval.

Figure 10:
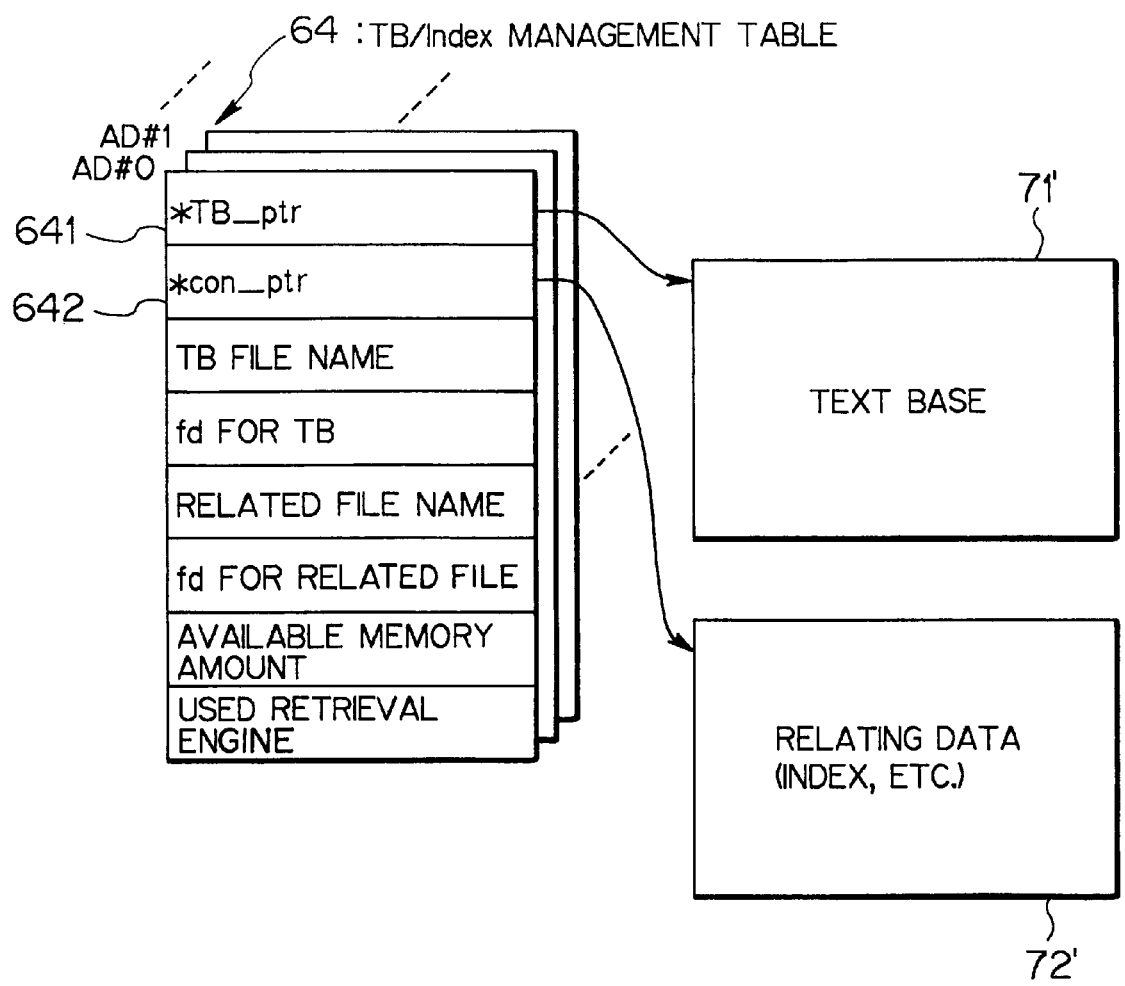
FIG. 10 is a diagrammatic view showing an example of text base/index (TB/Index) management table used in the information retrieval system of FIG. 2.

For example, each of the text base/index management tables 64 stores, as seen from FIG. 10, a text base pointer (*TB ptr) 641 and a relating data pointer (*con ptr) 642 as well as various informations such as a text base (TB) file name, a file descriptor for a text base (TB) which has been opened, a relating file name, a file descriptor for a relating file which has been opened (fd for a relating file), an available memory amount and an applicable retrieval engine for each access descriptor (AD#0, AD#1, . . . ).

Also in this instance, each of the retrieval servers 6 can refer to information of all of the text files 71' and the relating files 72' held in itself, for example, by storing a top address of a text file 71' read in (address information indicative of a stored position in the text region 65) into the text base pointer 641 and storing top address information of a relating file 72' read in into the relating data pointer 642.

The retrieval section 66 performs, if a retrieval request is received from a user management server 4 through the retrieval server instruction analysis section 62, information retrieval for a divided part 81 (a text file 71' and a relating file 72') of a text base 8 read into the text region 65 by the file access section 63 using one of the retrieval engines 61-1 to 61-m which is designated by the retrieval algorithm information from the retrieval management server 5.

The retrieval match information storage section 67 stores a result of retrieval by the retrieval section 66 once into the match point table 68. For example, in this instance, a position (address information) in the text region 65 of data which match a retrieval condition such as a keyword is stored as match point data into the match point table 68.

The retrieval result send-out section 69 returns match point data (address information) stored in the match point table 68 by the retrieval match information storage section 67 as a result of retrieval for a retrieval object text base 8 to a user management server 4 of a source of a retrieval request. The original data transfer section 70 extracts, in response to a match data recovery request from a user management server 4, original data in the text region 65 corresponding to match point data sent thereto together with the match data recovery request, and transfers the extracted original data to the user management server 4.

In short, each of the retrieval servers 6 reads only a divided part 81 of a text base 8, for which it should perform retrieval by the file access section 63 thereof, into the text region 65 and performs information retrieval for the divided part 81 by means of the retrieval section 66 thereof so that information retrieval for the divided parts 81 of the retrieval object text base 8 may be performed parallelly to and independently of each other.

It is to be noted that Tables 1 to 3 given below show an example of parameters (communication protocols) added upon communication between a user management server 4, the retrieval management server 5 and a retrieval server 6 described hereinabove. For example, Table 1 shows a communication protocol between a user management server 4 and the retrieval management server 5 and indicates that, when a text base inquiry request is to be issued from a user management server 4 to the retrieval management server 5, a text base name is added as a parameter, and to a reply from the retrieval management server 5 to the inquiry request, an access descriptor and an ID (group) of those retrieval servers (group) 6 which hold the retrieval object text base 8 to which the inquiry request has been issued are added as parameters.

TABLE 1

Communication Protocol between User Management Server and Retrieval Management Server

| | User management server → retrieval management server (parameter(s) to be added) | Retrieval management server → user management server (parameter(s) to be added) |
| --- | --- | --- |
| Upon text base inquiry request | •text base name | •access descriptor (AD) •retrieval server ID (group) |
| Upon retrieval end notification | •access descriptor (AD) | none |

TABLE 2

Communication Protocol between Retrieval Management Server and Retrieval Server

| | Retrieval management server → retrieval server (parameter(s) to be added) | Retrieval server → retrieval management server (parameter(s) to be added) |
| --- | --- | --- |
| Upon text base loading instruction | •text file name •relating file name •access descriptor (AD) •division number of text base | none |
| Upon text base abandon instruction | •access descriptor (AD) | none |
| Upon retrieval server state notification instruction | none | •total in-charge text base number •total in-charge text base amount •available memory amount |

TABLE 3

Communication Protocol between User
Management Server and Retrieval Server

|  | User management server → retrieval server (parameters to be added) | Retrieval server → user management server (information to be transferred) |
| --- | --- | --- |
| Upon retrieval request | •retrieval keyword •access descriptor (AD) •user name | •hit number •addresses of retrieval keyword on TB •user name |
| Upon original data transfer request | •access descriptor (AD) •addresses of original data •transfer size per 1 item •user name | •transfer text base group •user name |

In the following, operation of the information retrieval system having such a construction as described above will be described in detail individually in regard to a user management server 4, the retrieval management server 5 and a retrieval server 6.

b2. Operation of the User Management Servers 4

First, operation of a user management server 4 will be described with reference to the flow charts (steps S1 to S16) shown in FIGS. 11 to 14.

Figure 11:
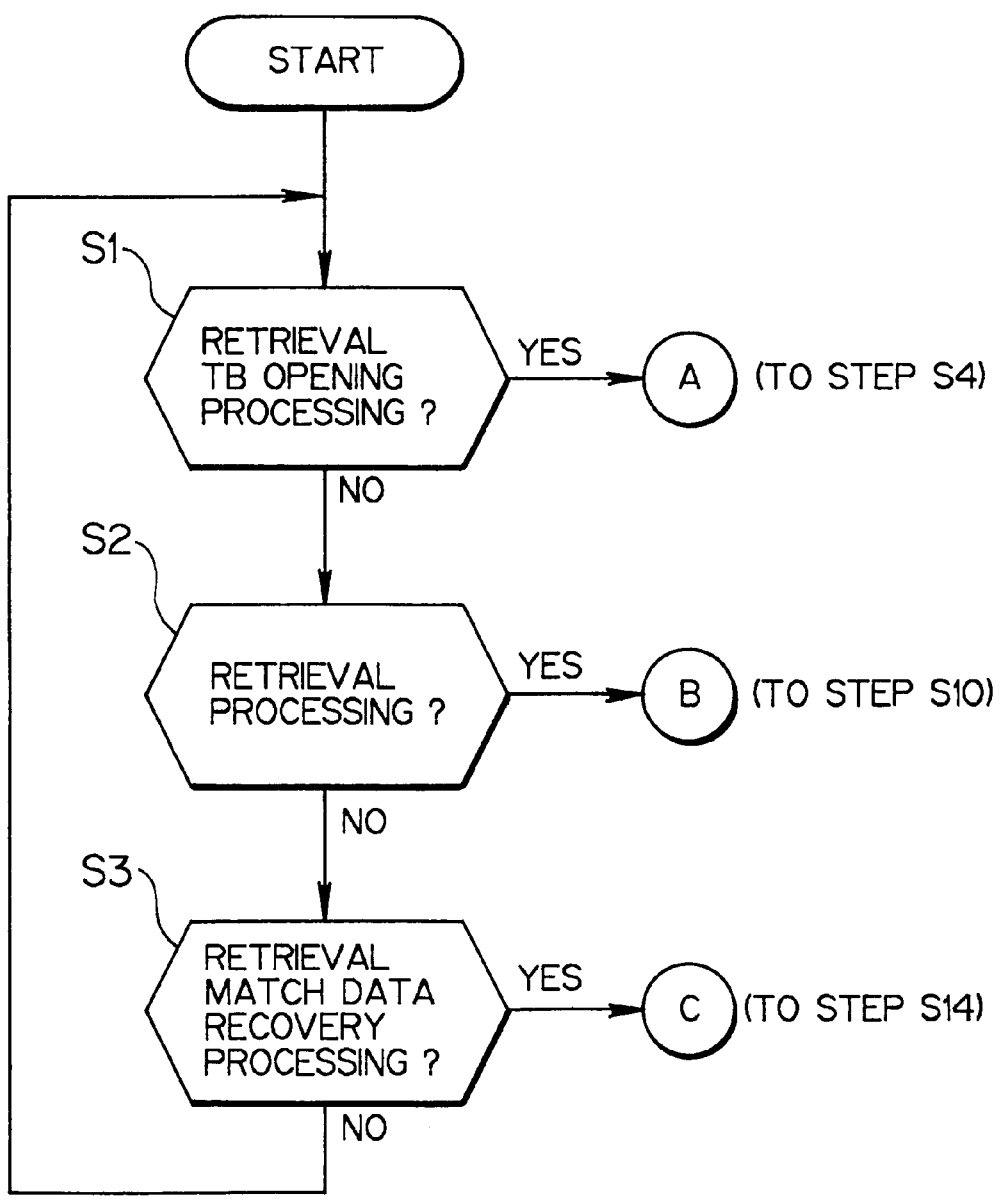
FIGS. 11 to 14 are flow charts illustrating operation of the user management server of FIG. 3.

For example, it is assumed that some processing request is issued from a user process to a user management server 4. In this instance, in the user management server 4, it is discriminated, as seen in FIG. 11, by the user management server instruction analysis section 43 (refer to FIG. 3) which one of opening processing, retrieval processing and retrieval match data recovery processing (transfer processing of a result of retrieval) of a retrieval object text base 8 the accepted request is (steps S1 to S3).

Figure 12:
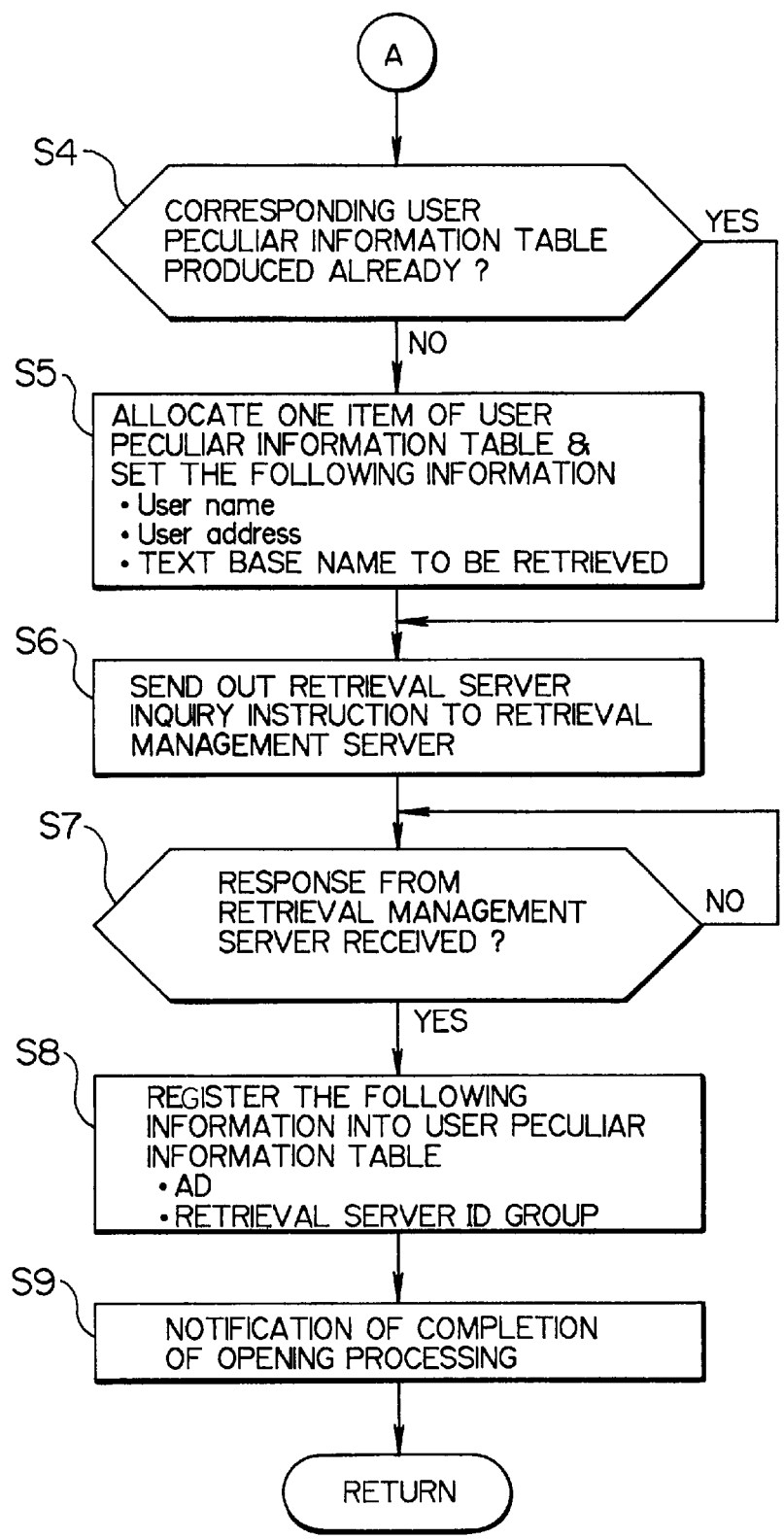

If the discrimination proves that the request from the user process is, for example, opening processing of a text base 8 (when the determination in step S1 is YES), then it is discriminated, as seen in FIG. 12, whether or not a user peculiar information table 41 (refer to FIG. 4) corresponding to the user from which the request was received has been produced already (step S4). If no such user peculiar information table 41 has been produced (when the determination in step S4 is NO), then the user peculiar information registration, updating and inquiry section 44 newly produces a user peculiar information table 41 corresponding to the user and sets a user name of the source of the request, a user address, a name of a text base to be retrieved and so forth (step S5). Then, a text base (retrieval server) inquiry request to which the text base name of the retrieval object text base 8 designated by the user is added is sent out to the retrieval management server 5 by the retrieval server inquiry section 45 (step S6).

It is to be noted that, if a user peculiar information table 41 corresponding to the user from which the request was received has already been produced, a text base (retrieval server) inquiry request is sent out to the retrieval management server 5 similarly based on the user peculiar information table 41 (from the YES route of step S4 to step S6).

Thereafter, the user management server 4 waits its processing until a response is received from the retrieval management server 5 (NO route of step S7). Then, if a response is received from the retrieval management server 5, then the user management server 4 produces, by the user peculiar information registration, updating and inquiry section 44 thereof, a retrieval condition list 412 in a list region indicated by the access descriptor pointer 41C of the user peculiar information table 41 and writes and registers parameters (an access descriptor, a retrieval server ID group, a text base name and so forth) added to the response from the retrieval management server 5 into the retrieval condition list 412 (from the YES route of step S7 to step S8).

After the processing described above is completed, the user management server 4 notifies the user, from which the request was received, that the opening processing of the retrieval object text base 8 has been completed, and then puts itself into a state in which it waits for a next request (step S9).

Figure 13:
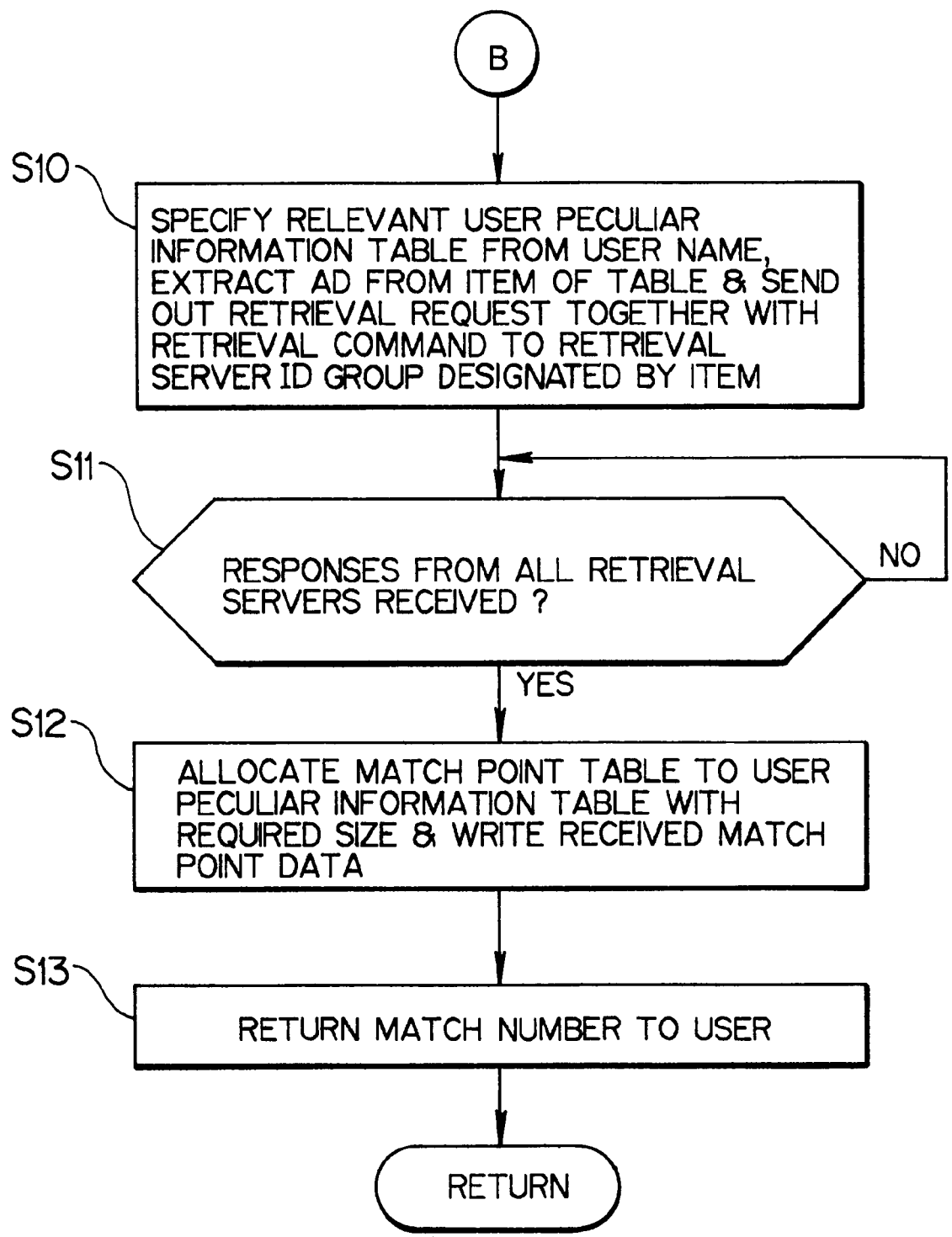

Then, if retrieval processing is requested from the user process and it is discriminated that the request accepted by the user management server instruction analysis section 43 is retrieval processing (if the determination in step S2 of FIG. 11 is YES), then the user peculiar information registration, updating and inquiry section 44 of the user management server 4 specifies, as seen in FIG. 13, the user peculiar information table 41 corresponding to the user name (User name) of the source of the request and extracts an access descriptor corresponding to the text base name designated by the user from an item (list 411) of the user peculiar information table 41, whereafter it sends out, by the retrieval request section 46 thereof, a retrieval request (retrieval command) together with the access descriptor to a retrieval server (for example, a retrieval server 6) corresponding to an ID (group) of retrieval servers designated by the retrieval server list 411 (step S10).

In short, the user management server 4 sends out, in response to the retrieval request from the user process, to the retrieval management server 5 an inquiry for information of a retrieval server group (an ID group of those retrieval servers 6 and so forth) which is performing retrieval for the retrieval object text base 8, and directly performs actual retrieval request to those retrieval servers 6 based on a result of the inquiry. It is to be noted that, if a text base name of an object of retrieval has not been designated by the user, then those retrieval object text bases 8 which correspond to all access descriptors held by the user are considered as an object of retrieval.

Then, the user management server 4 waits its processing until responses from all of those retrieval servers 6 to which the retrieval request was sent out are received (NO route of step S11), and at a point of time at which responses from all of those retrieval servers 6 are received, the user management server 4 allocates the match point table 413 (FIG. 4) to be linked to the user peculiar information table 41 by a required size and writes received match point data into the match point table 413 (step S12), whereafter the user management server 4 returns a match number to the user of the source of the request and then puts itself into a waiting condition for a next request (step S13).

Figure 14:
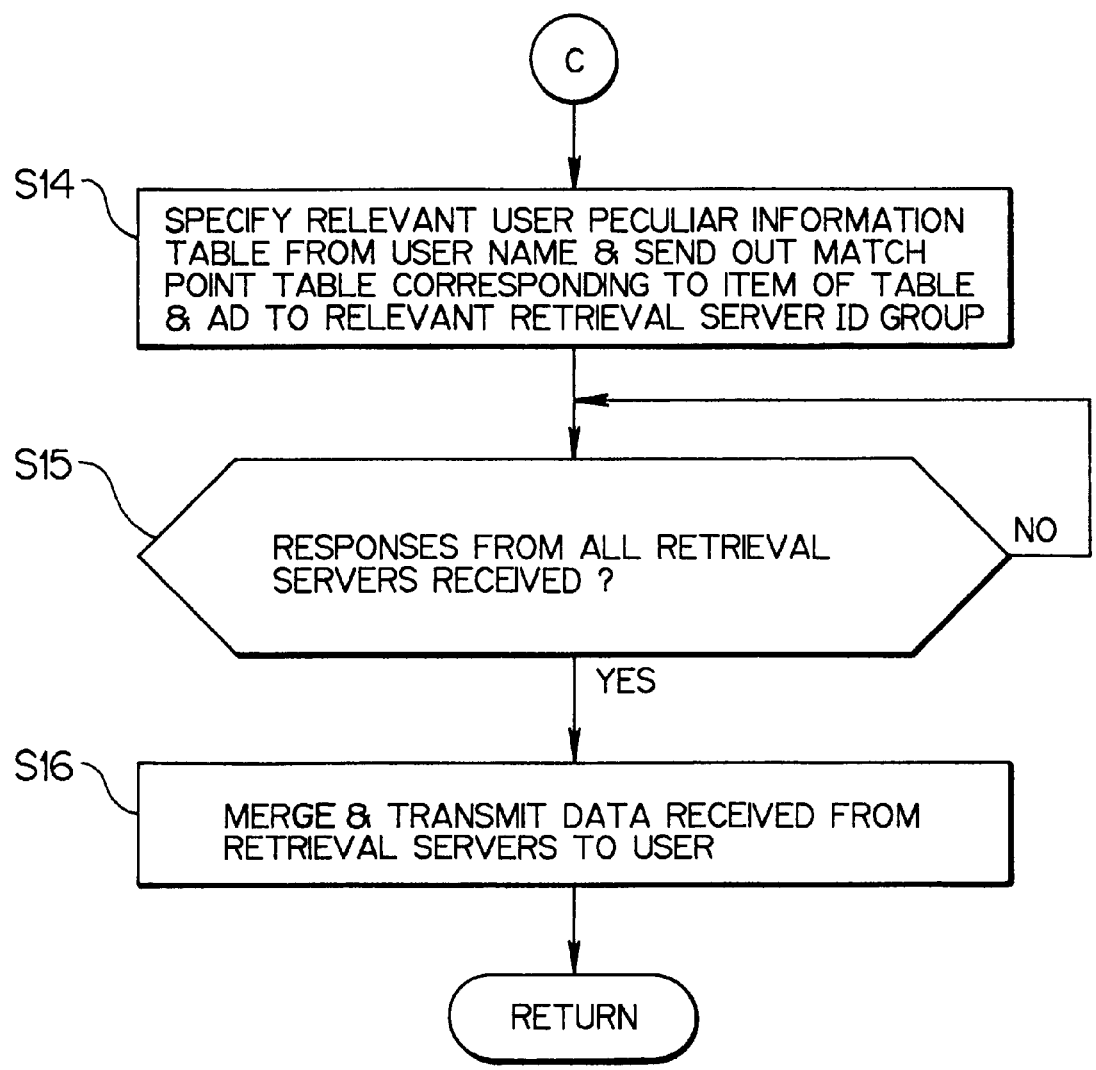

Then, if retrieval match data recovery processing (transfer processing of a result of retrieval) is requested from the user process and this is recognized by the user management server instruction analysis section 43 (when the determination in step S3 of FIG. 11 is YES), the user management server 4 first specifies, as seen from FIG. 14, a relevant user peculiar information table 41 from the user name of the source of the request by the user peculiar information registration, updating and inquiry section 44 thereof and extracts an address (matching point data) in the retrieval object text base 8 from the match point table 413 stored in the list 412 of the user peculiar information table 41 to produce a transfer request message to the retrieval servers 6.

Thereafter, the transfer request message is sent out together with the access descriptor to those retrieval servers 6, which have performed retrieval, based on the retrieval server group information (ID group of those retrieval servers 6) (step S14). It is to be noted that, if a text base name of a request for transfer has not been designated by the user, match point data of the match point table 413 corresponding to all access descriptors held by the user are considered as an object of transfer processing.

Then, the user management server 4 waits its processing until responses from all of those retrieval servers 6 to which the request for transfer was sent out are received (NO route of step S15), and at a point of time at which responses from all of those retrieval servers 6 are received, it edits (merges), by the retrieval match data recovery section 47 thereof, data transferred thereto from those retrieval servers 6 for the individual access descriptors and then transfers, by the external instruction packet transmission-reception section 42 thereof, the edited data as a result of retrieval to the user (from the YES route of step S15 to step S16).

In this manner, since the user management server 4 described above can always perform actual retrieval request directly to those retrieval servers 6 which hold a text base 8 of an object of retrieval by inquiring the retrieval management server 5 for information regarding those retrieval servers 6 which are performing information retrieval for the retrieval object text base 8 in response to a retrieval request from a user process, the user management server 4 can cause those retrieval servers 6 which will be hereinafter described to perform information retrieval processing for the retrieval object text base 8 without a delay from the retrieval request from the user process.

b3. Operation of the Retrieval Management Server 5

Subsequently, operation of the retrieval management server 5 will be described wit reference to the flow charts (steps S21 to S39) shown in FIGS. 15 to 17.

Figure 15:
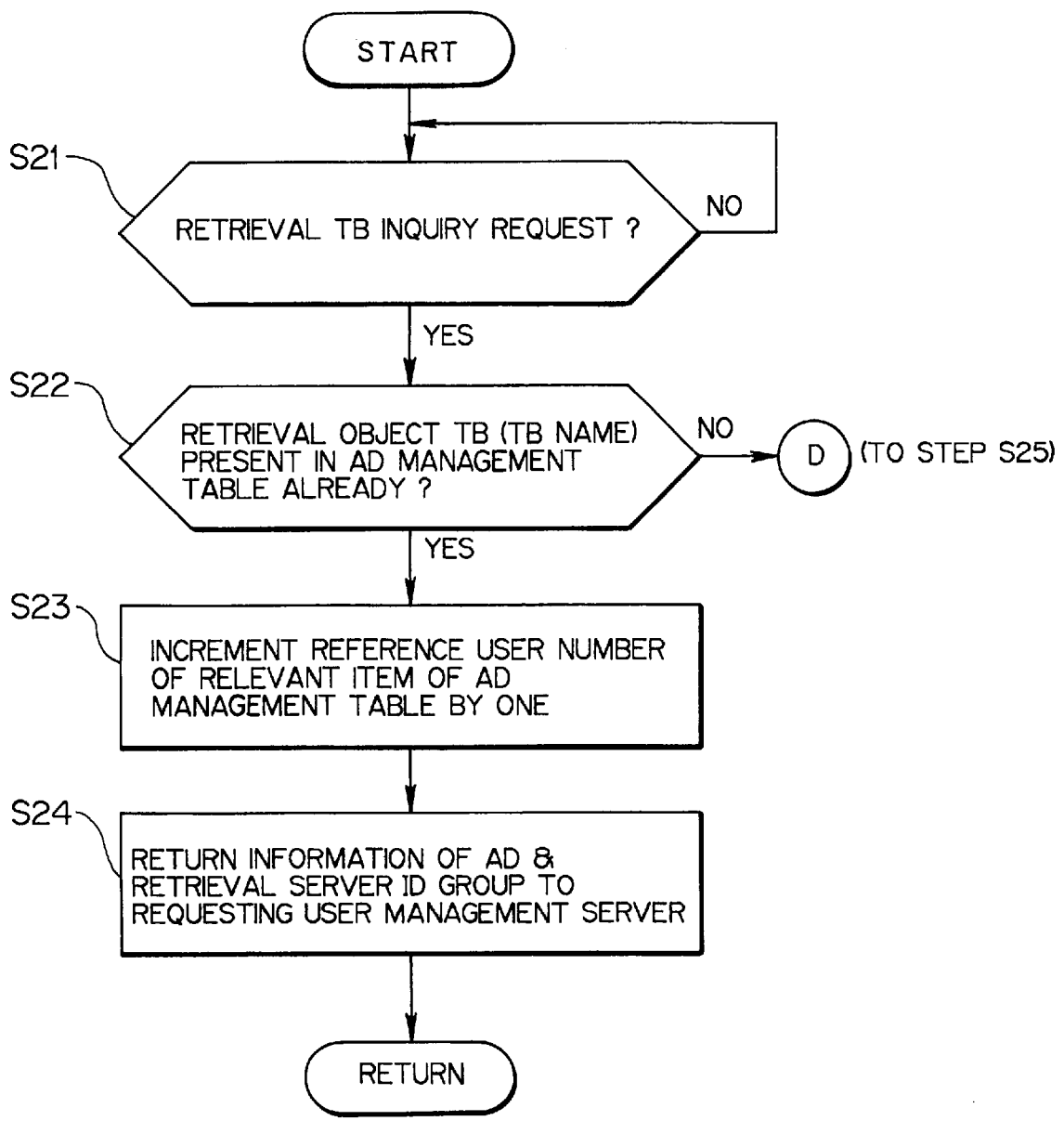
FIGS. 15 to 17 are flow charts illustrating operation of the retrieval management server of FIG. 5.

Referring first to FIG. 15, the retrieval management server 5 first keeps its waiting state until an inquiry request for a retrieval text base is received from a user management server 4 (NO route of step S21). If, in this state, for example, an inquiry request for a text base 8 is sent out from a user management server 4 as described hereinabove in connection with step S6 of FIG. 12, then the retrieval management server 5 receives the inquiry request and discriminates by the access descriptor allocation section 56 thereof whether or not the text base 8 for which the inquiry request has been received is present (registered) already in the access descriptor management table 52 (from the YES route of step S21 to step S22).

Then, if the text base 8 for which the inquiry request has been received is registered already and loaded in the retrieval servers 6, the reference user number (refer to FIG. 7) of the access descriptor management table 52 is incremented by one by the table updating section 55 (step S23), and a corresponding access descriptor and retrieval server group information (an ID group of retrieval servers 6 and so forth) registered already are returned to the user management server 4 of the source of the inquiry (step S24).

In short, if a retrieval object text base 8 for which an inquiry request has been received is loaded already in the retrieval servers 6, the retrieval management server 5 transfers information regarding those retrieval servers 6 registered already in the access descriptor management table 52 to the user management server 4 without newly specifying retrieval servers in which the retrieval object text base 8 is held. Accordingly, in this instance, the processing time until the user management server 4 of the source of the inquiry request issues an actual retrieval request to those retrieval servers 6 is reduced remarkably.

Figure 16:
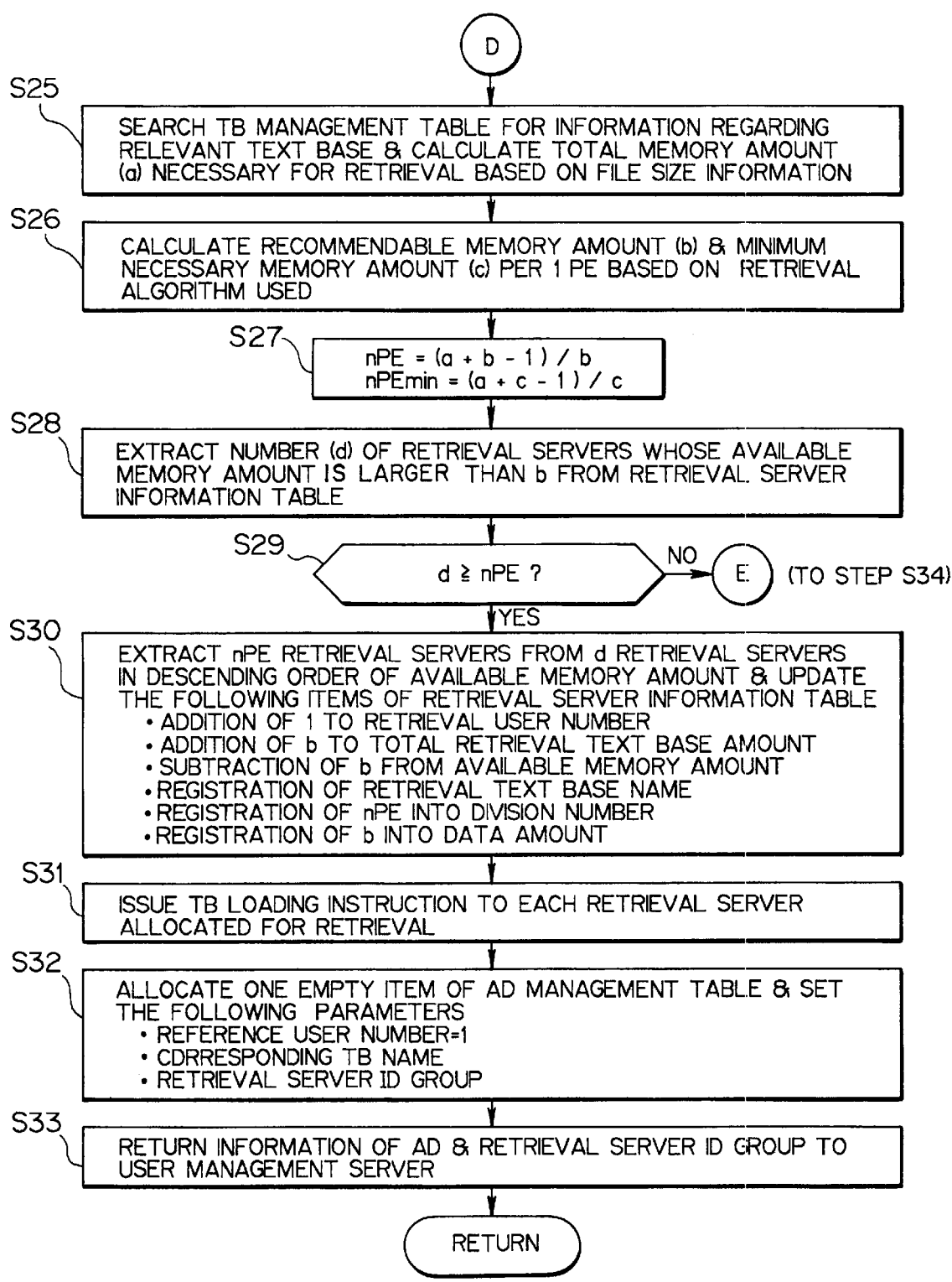

On the other hand, if the retrieval object text base 8 for which the inquiry request has been received is not loaded as yet (when the determination in step S22 is NO), information regarding the relevant text base 8 is specified from the text base management table 51 (refer to FIG. 6) as seen from FIG. 16 by the data division number decision section 57, and a total memory amount "a" necessary for retrieval, a recommendable memory amount "b" per one processor element with which the retrieval servers 6 can perform information retrieval sufficiently and a minimum memory amount "c" which is a minimum level of a remaining memory amount per one processor element are calculated based on size information of the text files 71' in which the substance of the retrieval object text base 8 is stored, applicable retrieval algorithm information managed by the text base management tables 51 and available memory amounts of the retrieval servers 6 managed by the retrieval server information tables 53 (steps S25 and S26).

Further, the data division number decision section 57 calculates, using the memory amounts "a", "b" and "c" calculated in such a manner as described above, a division number "nPE" and a minimum division number "nPEmin" by calculation of the expressions (a+b−1)/b and (a+c−1)/c (step S27). Then, a retrieval server number "d" which represents a number of those retrieval servers whose available memory amount is larger than the recommendable memory amount "b" is extracted based on the retrieval server information table 53 (refer to FIG. 8) (step S28). Then, it is discriminated whether or not the retrieval server number "d" is equal to or larger than the division number "nPE" (step S29).

If the discrimination reveals that the retrieval server number "d" is equal to or larger than the division number "nPE" (when the determination in step S29 is YES), or in other words, if a number of retrieval servers 6 equal to the division number "nPE" decided by the data division number decision section 57 as described above can be allocated, then the retrieval server allocation section 58 extracts "nPE" retrieval servers 6 from among "d" retrieval servers 6 whose available memory amount is larger than the recommendable memory amount "b", and various information in the retrieval server information tables 53 is updated in the following manner by the table updating section 55 (from the YES route of step S29 to step S30).

addition of 1 to "retrieval user number"

addition of the recommendable memory amount "b" to the "total retrieval text base amount"

subtraction of the recommendable memory amount "b" from the "available memory amount"

registration of the "retrieval text base name"

registration of "nPE" into the "division number"

registration of the recommendable memory amount "b" into the "data amount"

In short, the retrieval management server 5 successively allocates those text files 71' in which the substance of the text base 8 is stored and those relating files 72' in which relating data to the retrieval object text base 8 are stored in the descending order of the available memory amount of the retrieval servers 6 by the retrieval server allocation section 58 in accordance with the division number "nPE" of the retrieval object text base 8 decided by the data division number decision section 57 and the available memory amounts of the retrieval servers 6.

Accordingly, in this instance, such a situation that the load to a particular retrieval server 6 becomes excessively heavy does not occur, and the individual retrieval servers 6 normally perform information retrieval processing at a high speed in an optimum load situation.

Thereafter, the retrieval management server 5 sends out, by the loading instruction section 59 thereof, for example, a loading instruction for loading the divided parts 81 (text files 71') of the retrieval object text base 8 and the relating files 72' dispersedly to the retrieval servers 6 of the destinations of allocation based on a result of such allocation by the retrieval server allocation section 58 as described above (step S31).

Then, the access descriptor allocation section 56 allocates an empty item to the access descriptor management table 52 based on the text base management tables 51 and the retrieval server information tables 53, and sets the reference user number to "1", sets the corresponding text base name to the file name of the retrieval object text base 8 and sets the ID group of those retrieval servers 6 which hold the divided parts 81 of the retrieval object text base 8 (step S32). Thereafter, the retrieval management server 5 sends out a reply of the corresponding access descriptor and the ID group of those retrieval servers 6 to the user management server 4 of the source of the inquiry request, thereby ending the processing (step S33).

Figure 17:
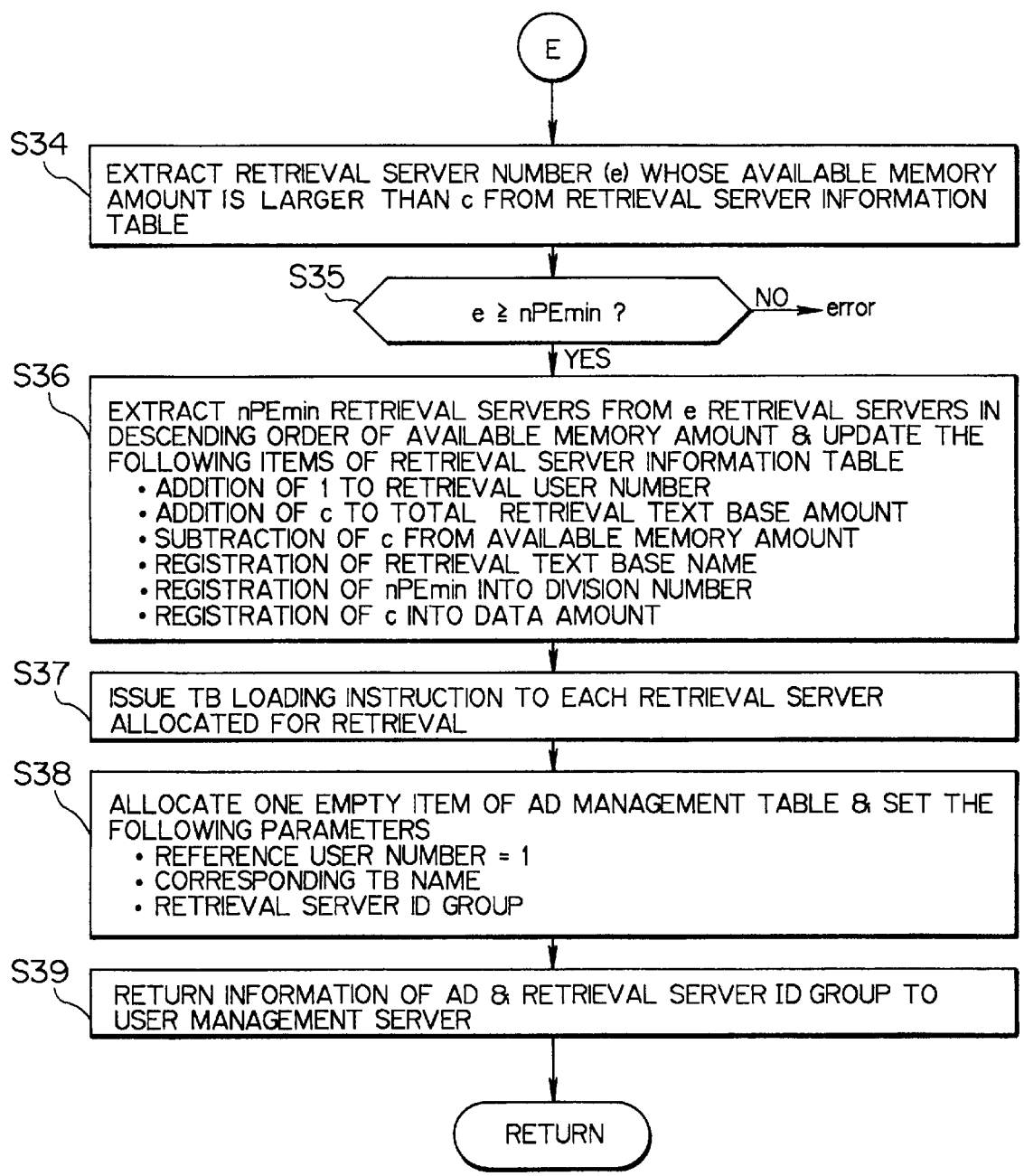

On the other hand, if the retrieval server number "d" is smaller than the division number "nPE" (when the discrimination in step S29 is YES), or in other words, when a number of retrieval servers equal to the division number "nPE" cannot be allocated, a number "e" of those retrieval servers whose available memory amount is greater than the minimum memory amount "c" (those retrieval servers which do not have a remaining memory amount equal to or greater than the recommendable memory amount "b" but have a remaining memory amount equal to or greater than the minimum necessary memory amount "c") is extracted from the retrieval server information table 53 by the data division number decision section 57 to reconsider the division number "nPE" as seen in FIG. 17 (step S34).

Then, the retrieval server number "e" extracted in such a manner as described above is compared with the minimum division number "nPEmin" calculated in step S27 of FIG. 16 (step S35), and if e<nPEmin (when the determination in step S35 is NO), or in other words, if the number "e" of those retrieval servers which have a sufficient available memory amount (remaining memory amount) has become smaller than the minimum division number "nPEmin", it is determined that some abnormal situation has occurred, and error information is sent out to the user management server 4 of the source of the inquiry request.

On the other hand, if the number "e" of those retrieval servers which have a sufficient remaining memory amount is equal to or larger than the minimum division number "nPEmin" (e≧nPEmin) (when the discrimination in step S35 is YES), a number of retrieval servers equal to the minimum division number "nPEmin" are extracted in the descending order of the remaining memory amount from among the number of retrieval servers equal to the retrieval server number "e", and the divided parts 81 of the retrieval object text base 8 are individually allocated to the thus extracted retrieval servers by the retrieval server allocation section 58 and various information in the retrieval server information table 53 is updated in the following manner by the table updating section 55 (step S36).

addition of "1" to the "retrieval user number"

addition of the minimum memory amount "c" to the "total retrieval text base amount"

subtraction of the minimum memory amount "c" from the "available memory amount"

registration of the "retrieval text base name"

registration of "nPEmin" into the "division number"

registration of the minimum memory amount "c" into the "data amount"

Thereafter, the retrieval management server 5 sends, by the loading instruction section 59 thereof, a loading instruction for loading the divided parts 81 of the retrieval object text base 8 and relating data to the retrieval object text base 8 together with the text file names and the relating file names managed by the text base management tables 51 to those retrieval servers 6 to which retrieval for the divided parts 81 of the retrieval object text base 8 has been allocated by the retrieval server allocation section 58 as described above (step S37).

Then, the retrieval management server 5 allocates, by the access descriptor allocation section 56 thereof, an empty item to the access descriptor management table 52, and sets the "reference user number"=1, the corresponding text base name and the retrieval server ID group (loading information regarding those retrieval servers (group) 6 to which the retrieval object text base 8 is allocated) (step S38), whereafter it returns (transfers), by the loading instruction section (loading information transfer section) 59 thereof, the retrieval server ID group and the access descriptor as retrieval server group information to the user management server 4 of the source of the inquiry request (step S39).

In short, the retrieval management server 5 reconsiders, when a number of retrieval servers equal to the division number "nPE" decided by the data division number decision section 57 cannot be allocated by the retrieval server allocation section 58, the division number "nPE" of the retrieval object text base 8 decided by the data division number decision section 57 and effects processing by the retrieval server allocation section 58 and the loading instruction section (loading information transfer section) 59 in accordance with the thus reconsidered division number "nPEmin".

Accordingly, even if the retrieval object text base 8 has a large size, the divided parts 81 of the retrieval object text base 8 can normally be allocated to the retrieval servers 6 with sizes decided taking the available memory amounts (remaining memory amounts) of the retrieval servers 6 into consideration, and consequently, such a situation that the speed of retrieval is decreased remarkably or retrieval becomes impossible because of an excessively large size of the text base 8 does not occur.

It is to be noted that, while the retrieval management server 5 described above allocates the divided parts 81 of the text base 8 and relating data to the text base 8 to the retrieval servers 6 in the descending order of the available memory amount in accordance with the division number "nPE" of the retrieval object text base 8 and the available memory amounts of the retrieval servers 6, it may otherwise allocate the divided parts 81 of the text base 8 and the relating data in the ascending order of the load in accordance with the division number "nPE" described above and the load situations to the individual retrieval servers.

b4. Modified Operation of the Retrieval Management Server 5

Subsequently, modified operation of the retrieval management server 5 described above will be described with reference to the flow charts (steps S41 to S53) shown in FIGS. 18 and 19.

Figure 18:
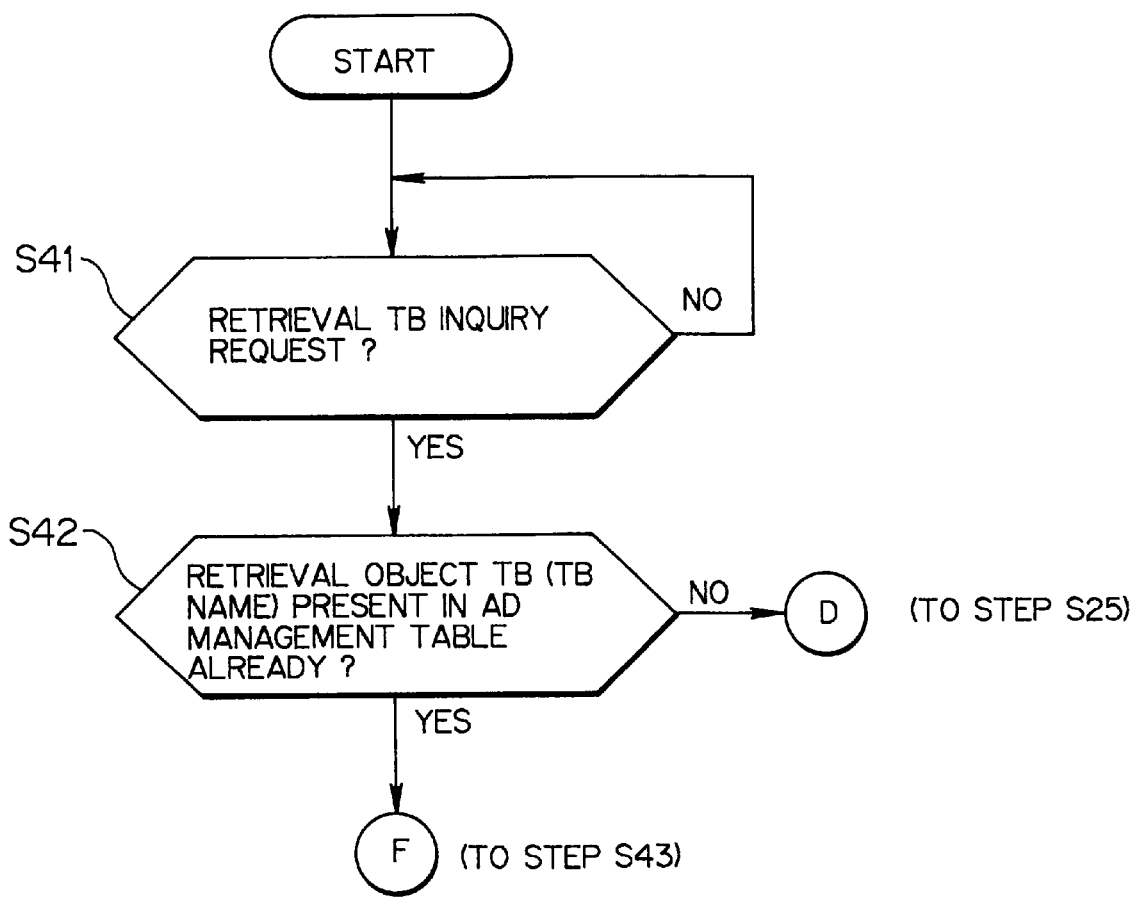
FIGS. 18 and 19 are flow charts illustrating modified operation of the retrieval management server of FIG. 5.
Figure 19:
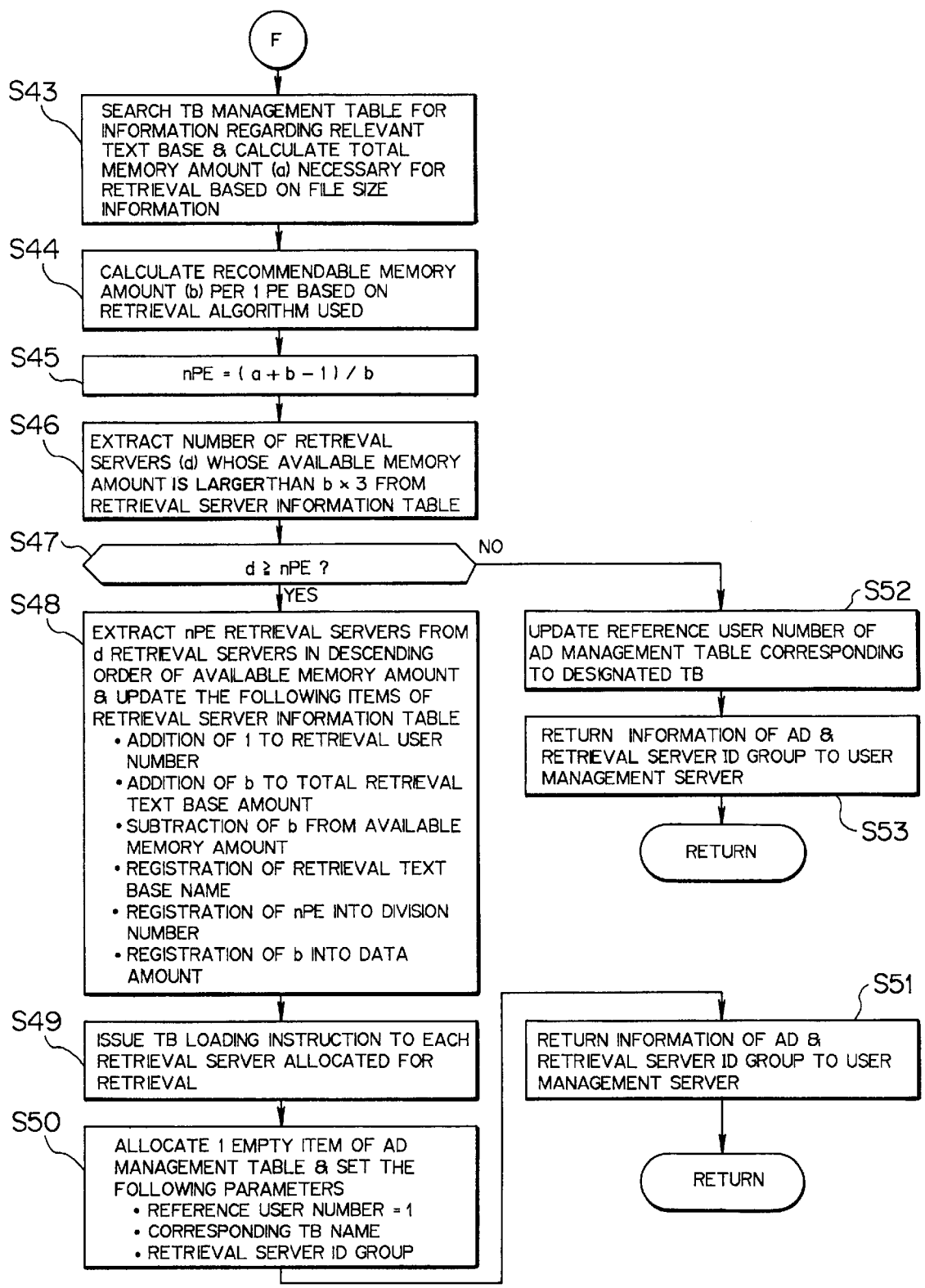

Referring first to FIG. 18, also in this instance, for example, if an inquiry request for a retrieval object text base 8 is received from a user management server 4 (when the discrimination in step S41 is YES), then the retrieval management server 5 discriminates, by the access descriptor allocation section 56 thereof, whether or not the retrieval object text base 8 for which the inquiry has been requested is present (registered) already in the access descriptor management table 52 (step S42).

If the discrimination reveals that the retrieval object text base 8 is not registered in the access descriptor management table 52 and not loaded in the retrieval servers 6 (when the discrimination in step S42 is NO), similar processing to that of steps S25 to S39 described hereinabove with reference to FIGS. 16 and 17 is performed. However, if the retrieval object text base 8 is loaded already (when the discrimination in step S42 is YES), information regarding the text base 8 is specified from the text base management table 51 by the data division number decision section 57 as seen in FIG. 19, and the total memory amount "a" necessary for information retrieval is calculated based on size information of the files in which the substance of the text base 8 is stored (step S43).

Further, the data division number decision section 57 calculates the recommendable memory amount "b" per one processor element based on applicable retrieval algorithm information of the text base management table 51 corresponding to the retrieval object text base 8 (step S44), and calculates the division number "nPE" of the retrieval object text base 8 by the calculation of nPE=(a+b−1)/b (step S46).

On the other hand, the retrieval server allocation section 58 extracts the number "d" of those retrieval servers whose available memory amount remains equal to or larger than a predetermined value (here, three times the recommendable memory amount "b") from the retrieval server information table 53 (step S46), and compares the retrieval server number "d" with the division number "nPE" of the retrieval object text base 8 to discriminate whether or not the retrieval server number "d" is equal to or larger than the division number "nPE" (d≧nPE) (step S47).

If the discrimination reveals that d≧nPE, that is, when those retrieval servers whose available memory amount is equal to or larger than three times the recommendable memory amount "b" can be allocated by a number equal to or larger than the division number "nPE" from among a plurality of retrieval servers, then the retrieval server allocation section 58 selects, from among a number of retrieval servers equal to the retrieval server number "d", those retrieval servers whose available memory amount is larger than "3×b" by a number equal to the division number "nPE" and updates various information in the retrieval server information tables 53 in such a manner as given below so that the retrieval object text base 8 and the relating data are allocated to the selected retrieval servers 6 and the various information in the retrieval server information tables 53 are updated in the following manner by the table updating section 55 (from the YES route of step S47 to step S48).

addition of "1" to the "retrieval user number"

addition of the recommendable memory amount "b" to the "total retrieval text base amount"

subtraction of the recommendable memory amount "b" from the "available memory amount"

registration of the "retrieval text base name"

registration of "nPE" into the "division number"

registration of the recommendable memory amount "b" into the "data amount"

Further, the retrieval management server 5 sends out, based on a result of the allocation by the retrieval server allocation section 58 described above, by the loading instruction section 59 thereof, a text base loading instruction for loading the divided parts 81 of the retrieval object text base 8 and the relating data into the retrieval servers of the destinations of allocation together with the text file names, the relating file names and applicable retrieval algorithm information managed by the text base management tables 51 to the retrieval servers of the destinations of allocation (step S49).

Thereafter, the retrieval management server 5 allocates, by the access descriptor allocation section 56 thereof, an empty item to the access descriptor management table 52, and sets parameters such as the "reference user number"=1, the corresponding text base name, the retrieval server ID group of the loading destination and so forth (step S50). Then, the retrieval management server 5 transfers, by the loading instruction section (loading information transfer section) 59 thereof, loading information regarding those retrieval servers 6 (group) to which the retrieval object text base 8 is allocated such as the retrieval server ID group and the access descriptor as retrieval server group information to be used actually for information retrieval for the retrieval object text base 8 to the user management server 4 (step S51).

By the way, if d<nPE in step S47 described above, or in other words, if those retrieval servers 6 whose available memory amount is larger than three times the recommendable memory amount "b" cannot be allocated by a number equal to or larger than the division number "nPE" from among the plurality of retrieval servers 6, then the "reference user number" of the access descriptor management table 52 corresponding to the designated retrieval object text base 8 (for which the inquiry has been requested) is updated (incremented) by the access descriptor allocation section 56 (from the NO route of step S47 to step S52).

Then, the loading information regarding the text base 8 registered already and managed by the access descriptor management table 52 (the ID group of those retrieval servers 6 in which the retrieval object text base 8 is loaded already) is transferred as it is as information of a retrieval server group which takes charge of information retrieval for the text base 8 to the user management server 4 by the loading instruction section (loading information transfer section) 59 (step S53).

In this manner, even if the retrieval object text base 8 for which the inquiry has been requested is loaded already, if those retrieval servers whose available memory amount is larger than a predetermined value (three times the recommendable memory amount "b) can be allocated by a number equal to or larger than the division number "nPE" of the text base 8 from among the retrieval servers 6, then the text base 8 loaded already is allocated dispersedly also to other retrieval servers whose available memory amount is larger than the predetermined value by the retrieval management server 5, and accordingly, information retrieval processing for the retrieval object text base 8 can be performed at a high speed.

It is to be noted that, while, in this instance, the retrieval object text base 8 loaded already is allocated to those retrieval servers whose available memory amount is larger than a predetermined value as described above, it may otherwise be allocated to those retrieval servers whose load is lighter than predetermined value.

b5. Operation of the Retrieval Servers 6

Subsequently, operation of each of the retrieval servers 6 will be described with reference to the flow chart (steps S55 to S62) shown in FIG. 20.

Figure 20:
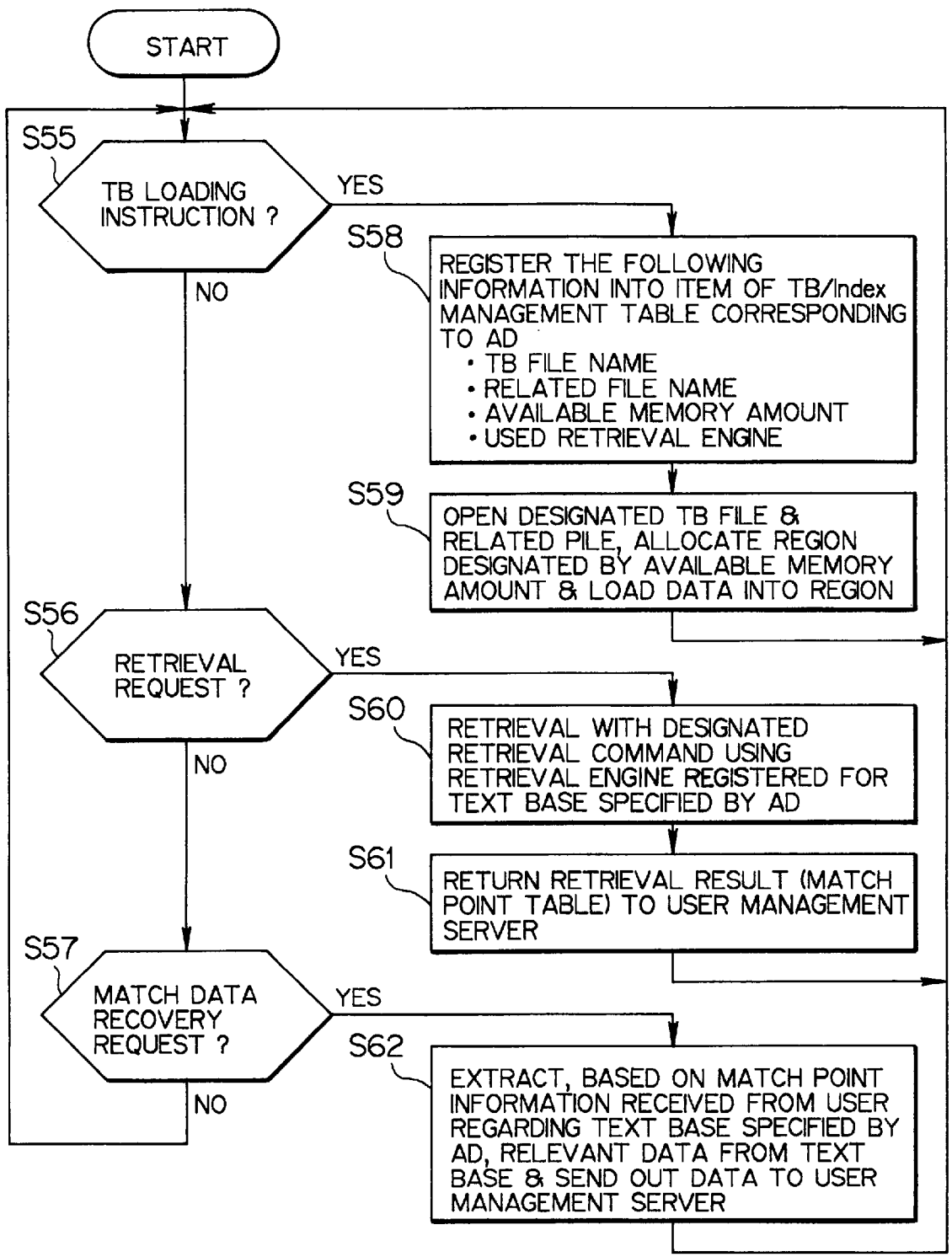
FIG. 20 is a flow chart illustrating operation of the retrieval server of FIG. 9.

Referring to FIG. 20, each of the retrieval servers 6 first discriminates, by the retrieval server instruction analysis section 62 thereof, whether a request accepted from the outside is a text base loading instruction from the retrieval management server 5 or a retrieval request or a match data recovery request (request for transfer of a result of retrieval) from the user management server 4 (steps S55 to S57).

Then, for example, if the accepted request is a text base loading instruction from the retrieval management server 5 (when the discrimination in step S55 is YES), a text file name, a relating file name, an available memory amount, an applicable retrieval engine (retrieval algorithm information) and so forth transmitted in the text base loading instruction are registered into a list of the text base/index management table 64 (refer to FIG. 10) corresponding to the access descriptor by the file access section 63 (step S58).

Further, the retrieval server 6 having received the text base loading instruction as described above opens, by the file access section 63 thereof, a text file 71' and a relating file 72' designated by the text file name and the relating file name included in the accepted text base loading instruction, allocates the text region 65 for the available memory amount and loads the text file 71' and the relating file 72' into the text region 65 (step S59).

Thereafter, for example, if a retrieval request for the retrieval object text base 8 loaded in such a manner as described above is received from a user management server 4 (when the discrimination in step S55 is NO and the discrimination in step S56 is YES), the retrieval server 6 having received the retrieval request effects, by the retrieval section 66 thereof, information retrieval with a retrieval command instructed by the user for the divided part 81 of the text base 8 read in the text region 65 using one of the retrieval engines 61-1 to 61-m registered in the text base/index management table 64, that is, one of the retrieval engines 61-1 to 61-m designated by the retrieval algorithm information from the retrieval management server 5 (step S60).

Then, a result of the retrieval by the retrieval section 66 (address information of match data in the text region 65) is successively stored into the match point table 68 by the retrieval match information storage section 67, and at a point of time when the information retrieval is completed, match point data (address information) stored in the match point table 68 are returned as a result of retrieval to the user management server 4 of the source of the retrieval request by the retrieval result send-out section 69 (step S61).

Further, for example, if the retrieval server 6 thereafter receives a match data recovery request for the retrieval object text base 8, for which retrieval has been performed as described above, from the user management server 4 (when the discriminations in steps S55 and S56 are NO and the discrimination in step S57 is YES), then it extracts, by the original data transfer section 70 thereof, relevant original data from the text base 8 read in the text region 65 based on match point data (address information) transmitted thereto from the user regarding the text base 8 specified by the access descriptor, and transfers the original data to the user management server 4 of the source of the request (step S62).

In this manner, since each of the retrieval servers 6 effects information retrieval only for a divided part 81 of a text base 8 allocated to it by the retrieval management server 5, parallel and independent processing for information retrieval for the text base 8 can be realized readily, and information retrieval for a retrieval object text base can be performed at a very high speed.

Further, since each of the retrieval servers 6 effects information retrieval for a divided part 81 of a text base 8 read in using one of the retrieval engines 61-1 to 61-m designated by retrieval algorithm information from the retrieval management server 5, optimum retrieval engines for the retrieval object text base 8 can be selected from among the retrieval engines 61-1 to 61-m to effect information retrieval for the text base 8. Accordingly, the retrieval engines 61-1 to 61-m can be selectively used to effect information retrieval processing in accordance with such a retrieval condition of, for example, whether importance upon information retrieval should be attached to the retrieval accuracy or to the retrieval speed. This contributes very much to the flexibility of information retrieval processing.

As described above, according to the information retrieval system of the present embodiment, since the retrieval management server 5 divides a retrieval object text base 8 and relating data regarding the retrieval object text base 8 and allocates the thus divided parts to some or all of the retrieval servers 6 and those retrieval servers 6 individually effect information retrieval for the divided parts 81 of the text base 8 allocated thereto parallelly to and independently of each other, even if the size of the text base 8 is large, the load of information retrieval processing by each retrieval server 6 is very light.

Accordingly, even if information retrieval for a plurality of text bases 8 is performed simultaneously in response to retrieval requests from a plurality of users, processing therefor can be performed at a very high speed without requiring special hardware.

It is to be noted that, while the information retrieval system described above is constructed such that it includes the user management servers 4 and that the user management servers 4 accept various requests from users and request the retrieval management server 5 and the retrieval servers 6 for processing in accordance with those requests so that information retrieval processing is performed, the user management servers 4 are not essential components to construction of the system, and the information retrieval system may effect information retrieval processing in response to a request from some other server or in response to a direct request from a user.

Further, while each of the retrieval servers 6 is constructed such that it selectively uses a plurality of different retrieval engines 61-1 to 61-m, it may otherwise include a single retrieval engine and use it fixedly, or alternatively it may directly effect information retrieval for a text base 8 of an object of retrieval without employing such retrieval engines.

The present invention is not limited to the specifically described embodiment, and variations and modifications may be made without departing from the scope of the present invention.

What is claimed is:

1. An information retrieval system, comprising:
   a plurality of retrieval servers for performing retrieval processing; and
   a retrieval management server for managing operation of said plurality of retrieval servers;
   wherein said retrieval management server divides a text base of a retrieval object and relating information regarding the text base into a number of parts based on a size of the text base and loads of the respective retrieval servers and selectively allocates the divided parts of the text base and the relating information corresponding to the divided parts in sets to some or all of said plurality of retrieval servers; and
   said plurality of retrieval servers perform information retrieval for the divided parts of the text base allocated by said retrieval management server parallelly to and independently of each other.

2. An information retrieval system as claimed in claim 1, further comprising a user management server for accepting a retrieval request from a user process, said user management server being constructed so as to inquire said retrieval management server for information of a group of those of said retrieval servers which are performing retrieval for the text base of a retrieval object in response to the retrieval request from the user process and directly request the retrieval servers in the group for actual retrieval based on a result of the inquiry.

3. An information retrieval system as claimed in claim 2, wherein said user management server includes:

a retrieval request acceptance section for accepting the retrieval request from the user process;

a retrieval server inquiry section for inquiring, in response to the retrieval request accepted by said retrieval request acceptance section, said retrieval management server for the information of the group of those of said retrieval servers to which retrieval processing for the text base of a retrieval object of the retrieval request is allocated;

a retrieval request section for sending out, based on the information of the group of those of said retrieval servers obtained from said retrieval management server by said retrieval server inquiry section, a retrieval request directly to those of said retrieval servers to which the retrieval processing for the text base of a retrieval object of the retrieval request is allocated; and a retrieval result transfer section for merging responses to the retrieval request of said retrieval request section from the retrieval servers and transferring the merged responses as a result of retrieval to the user process of the source of the retrieval request.

4. An information retrieval system, comprising:

a plurality of retrieval servers for performing retrieval processing; and a retrieval management server for managing operation of said plurality of retrieval servers;

said retrieval management server being constructed so as to divide a text base of a retrieval object and relating information regarding the text base and allocate resulting divided parts of the text base and the relating information corresponding to the divided parts in sets to some or all of said plurality of retrieval servers;

said plurality of retrieval servers being constructed so as to perform information retrieval for the divided parts of the text base allocated by said retrieval management server parallelly to and independently of each other;

wherein said retrieval management server includes, a retrieval server management section for managing, for each of said retrieval servers, retrieval server information including a name of the text base for which the retrieval server takes charge of retrieval and an amount of data of one of the divided parts for which the retrieval server takes charge of retrieval of the text base;

a text base management section for managing, for each of text bases each of which may serve as the text base of a retrieval object, a name of the text base, a name of a data file for storing a substance of the text base, and a name of a relating information file for storing relating information regarding the text base;

a division number decision section for deciding, before retrieval of a text base is started, a division number of the text base based on size information of the text base and load situations of said retrieval servers obtained from the retrieval server information managed by said retrieval server management section;

a retrieval server allocation section for selectively allocating, in accordance with the division number decided by said division number decision section and the load situations of said retrieval servers, the text base and the relating information of the text base to said retrieval servers in the ascending order of the load; and a loading instruction section for sending, based on a result of the allocation by said retrieval server allocation section, a loading instruction for loading one of the divided parts of the text base and the relating information into a designated one of said retrieval servers to those of said retrieval servers, to which retrieval is allocated by said retrieval server allocation section, together with the name of the data file and the name of the relating information file managed by said text base management section.

5. An information retrieval system as recited in claim 4, wherein each of said retrieval servers includes:

a file access section for reading in, when the loading instruction is received from said retrieval management server, one of the divided parts of the text base and the corresponding relating information designated by the name of the data file and the name of the relating information file included in the loading instruction;

a retrieval section for performing, when a retrieval request is received, information retrieval for the divided part of the text base read in by said file access section; and a retrieval result send-out section for returning a result of the retrieval by said retrieval section to a source of the retrieval request.

6. An information retrieval system, comprising:

a plurality of retrieval servers for performing retrieval processing; and a retrieval management server for managing operation of said plurality of retrieval servers;

said retrieval management server being constructed so as to divide a text base of a retrieval object and relating information regarding the text base and allocate resulting divided parts of the text base and the relating information corresponding to the divided parts in sets to some or all of said plurality of retrieval servers;

said plurality of retrieval servers being constructed so as to perform information retrieval for the divided parts of the text base allocated by said retrieval management server parallelly to and independently of each other, wherein said retrieval management server includes, a retrieval server management section for managing, for each of said retrieval servers, retrieval server information including a name of the text base for which the retrieval server takes charge of retrieval, an amount of data of one of the divided parts for which the retrieval server takes charge of retrieval of the text base, and an available memory amount;

a text base management section for managing, for each of text bases each of which may serve as the text base of a retrieval object, a name of the text base, a name of a data file for storing a substance of the text base, a name of a relating information file for storing relating information regarding the text base, and information of a retrieval algorithm to be used;

a division number decision section for deciding, before retrieval of a text base is started, a division number of the text base based on size information of the text base, the information of the retrieval algorithms managed by said text base management section and the available memory amounts of said retrieval servers managed by said retrieval server management section;

a retrieval server allocation section for selectively allocating, in accordance with the division number decided by said division number decision section and the available memory amounts of said retrieval servers, the text base and the relating information of the text base to said retrieval servers in the descending order of the available memory amount; and a loading instruction section for sending, based on a result of the allocation by said retrieval server allocation section, a loading instruction for loading one of the divided parts of the text base and the relating information into a designated one of said retrieval servers to those of said retrieval servers, to which retrieval is allocated by said retrieval server allocation section, together with the name of the data file, the name of the relating information file and the retrieval algorithm information managed by said text base management section.

7. An information retrieval system as recited in claim 6, wherein each of said retrieval servers includes:

a file access section for reading in, when the loading instruction is received from said retrieval management server, one of the divided parts of the text base and the corresponding relating information designated by the name of the data file and the name of the relating information file included in the loading instruction;

a retrieval section including a plurality of different retrieval algorithms for performing, when a retrieval request is received, information retrieval for the divided part of the text base read in by said file access section using one of the retrieval algorithms designated by the retrieval algorithm information from said retrieval management server; and a retrieval result send-out section for returning a result of the retrieval by said retrieval section to a source of the retrieval request.

8. An information retrieval system, comprising:

a plurality of retrieval servers for performing retrieval processing;

a retrieval management server for managing operation of said plurality of retrieval servers;

said retrieval management server being constructed so as to divide a text base of a retrieval object and relating information regarding the text base and allocate resulting divided parts of the text base and the relating information corresponding to the divided parts in sets to some or all of said plurality of retrieval servers, and said plurality of retrieval servers being constructed so as to perform information retrieval for the divided parts of the text base allocated by said retrieval management server parallelly to and independently of each other;

a user management server for accepting a retrieval request from a user process, said user management server being constructed so as to inquire said retrieval management server for information of a group of those of said retrieval servers which are performing retrieval for the text base of a retrieval object in response to the retrieval request from the user process and directly request the retrieval servers in the group for actual retrieval based on a result of the inquiry, wherein the user management server includes a retrieval request acceptance section for accepting the retrieval request from the user process;

a retrieval server inquiry section for inquiring, in response to the retrieval request accepted by said retrieval request acceptance section, said retrieval management server for the information of the group of those of said retrieval servers to which retrieval processing for the text base of a retrieval object of the retrieval request is allocated;

a retrieval request section for sending out, based on the information of the group of those of said retrieval servers obtained from said retrieval management server by said retrieval server inquiry section, a retrieval request directly to those of said retrieval servers to which the retrieval processing for the text base of a retrieval object of the retrieval request is allocated; and a retrieval result transfer section for merging responses to the retrieval request of said retrieval request section from the retrieval servers and transferring the merged responses as a result of retrieval to the user process of the source of the retrieval request;

wherein the retrieval management includes, a retrieval server management section for managing, for each of said retrieval servers, retrieval server information including a name of the text base for which the retrieval server takes charge of retrieval and an amount of data of one of the divided parts for which the retrieval server takes charge of retrieval of the text base;

a loading information management section for managing loading information regarding a group of those of said retrieval servers which are destinations of loading of the text base of a retrieval object;

a text base management section for managing, for each of text bases each of which may serve as the text base of a retrieval object, a name of the text base, a name of a data file for storing a substance of the text base, and a name of a relating information file for storing relating information regarding the text base;

a division number decision section for deciding, when the text base of a retrieval object of the inquiry request received from said user management server is not loaded as yet, a division number of the text base based on size information of the text base and load situations of said retrieval servers obtained from the retrieval server information managed by said retrieval server management section;

a retrieval server allocation section for selectively allocating, in accordance with the division number decided by said division number decision section and the load situations of said retrieval servers, the text base and the relating information of the text base to said retrieval servers in the ascending order of the load;

a loading instruction section for sending, based on a result of the allocation by said retrieval server allocation section, a loading instruction for loading one of the divided parts of the text base and the relating information into a designated one of said retrieval servers to those of said retrieval servers, to which retrieval is allocated by said retrieval server allocation section, together with the name of the data file and the name of the relating information file obtained from said text base management section; and a loading information transfer section for transferring loading information regarding the group of those of said retrieval servers to which the text base of a retrieval object is allocated by said retrieval server allocation section as retrieval server group information to said user management server.

9. An information retrieval system as recited in claim 8 wherein, when a number of those of said retrieval servers equal to the division number determined by said division number decision section cannot be allocated by said retrieval server allocation section, the division number of the text base determined by said division number decision section is reconsidered, and processing by said retrieval server allocation section, said loading instruction section and said loading information transfer section is performed in accordance with the reconsidered division number.

10. An information retrieval system as recited in claim 9, wherein, when the text base of a retrieval object of the inquiry request received from said user management server is loaded already, said loading information transfer section transfers the loading information regarding the text base of a retrieval object managed by said loading information management section as retrieval server group information to said user management server.

11. An information retrieval system as recited in claim 10, wherein each of said retrieval servers includes:
   a file access section for reading in, when the loading instruction is received from said retrieval management server, one of the divided parts of the text base and the corresponding relating information designated by the name of the data file and the name of the relating information file included in the loading instruction;
   a retrieval section for performing, when a retrieval request is received from said user management server, information retrieval for the divided part of the text base read in by said file access section; and
   a retrieval result send-out section for returning a result of the retrieval by said retrieval section to said user management server.

12. An information retrieval system as recited in claim 9, wherein, when the text base of a retrieval object of the inquiry request received from said user management server is loaded already, said division number decision section decides a division number of the text base based on size information of the text base and load situations of said retrieval servers obtained from the retrieval server information managed by said retrieval server management section, and when those of said retrieval servers whose load is lighter than a predetermined value can be allocated by a number equal to the division number decided by said division number decision section from among said plurality of retrieval servers, said retrieval server allocation section selects the division number of those of said retrieval servers whose load is lighter than the predetermined value and allocates the text base and the relating information to the selected retrieval servers, whereafter said loading instruction section sends, based on a result of the allocation by said retrieval server allocation section, a loading instruction for loading the divided parts of the text base and the relating information into the retrieval servers of the destinations of allocation to the retrieval servers of the destinations of allocation together with the name of the data file and the name of the relating information file obtained from said text base management section and said loading information transfer section transfers loading information regarding the group of those of said retrieval servers to which the text base is allocated by said retrieval server allocation section as retrieval server group information to said user management server, but when those of said retrieval servers whose load is lighter than the predetermined value cannot be allocated by a number equal to the division number determined by said division number decision section from among said plurality of retrieval servers, said loading information transfer section transfers the loading information of the text base of a retrieval object managed by said loading information management section as retrieval server group information to said user management server.

13. An information retrieval system as recited in claim 12, wherein each of said retrieval servers includes:
   a file access section for reading in, when the loading instruction is received from said retrieval management server, one of the divided parts of the text base and the corresponding relating information designated by the name of the data file and the name of the relating information file included in the loading instruction;
   a retrieval section for performing, when a retrieval request is received from said user management server, information retrieval for the divided part of the text base read in by said file access section; and
   a retrieval result send-out section for returning a result of the retrieval by said retrieval section to said user management server.

14. An information retrieval system as recited in claim 9, wherein each of said retrieval servers includes:
   a file access section for reading in, when the loading instruction is received from said retrieval management server, one of the divided parts of the text base and the corresponding relating information designated by the name of the data file and the name of the relating information file included in the loading instruction;
   a retrieval section for performing, when a retrieval request is received from said user management server, information retrieval for the divided part of the text base read in by said file access section; and
   a retrieval result send-out section for returning a result of the retrieval by said retrieval section to said user management server.

15. An information retrieval system as recited in claim 8, wherein, when the text base of a retrieval object of the inquiry request received from said user management server is loaded already, said loading information transfer section transfers the loading information regarding the text base of a retrieval object managed by said loading information management section as retrieval server group information to said user management server.

16. An information retrieval system as recited in claim 15, wherein each of said retrieval servers includes:
   a file access section for reading in, when the loading instruction is received from said retrieval management server, one of the divided parts of the text base and the corresponding relating information designated by the name of the data file and the name of the relating information file included in the loading instruction;
   a retrieval section for performing, when a retrieval request is received from said user management server, information retrieval for the divided part of the text base read in by said file access section; and
   a retrieval result send-out section for returning a result of the retrieval by said retrieval section to said user management server.

17. An information retrieval system as recited in claim 8, wherein, when the text base of a retrieval object of the inquiry request received from said user management server is loaded already, said division number decision section decides a division number of the text base based on size information of the text base and load situations of said retrieval servers obtained from the retrieval server information managed by said retrieval server management section, and when those of said retrieval servers whose load is lighter than a predetermined value can be allocated by a number equal to the division number decided by said division number decision section from among said plurality of retrieval servers, said retrieval server allocation section selects the division number of those of said retrieval servers whose load is lighter than the predetermined value and allocates the text base and the relating information to the selected retrieval servers, whereafter said loading instruction section sends, based on a result of the allocation by said retrieval server allocation section, a loading instruction for loading the divided parts of the text base and the relating information into the retrieval servers of the destinations of allocation to the retrieval servers of the destinations of allocation together with the name of the data file and the name of the relating information file obtained from said text base management section and said loading information transfer section transfers loading information regarding the group of those of said retrieval servers to which the text base is allocated by said retrieval server allocation section as retrieval server group information to said user management server, but when those of said retrieval servers whose load is lighter than the predetermined value cannot be allocated by a number equal to the division number determined by said division number decision section from among said plurality of retrieval servers, said loading information transfer section transfers the loading information of the text base of a retrieval object managed by said loading information management section as retrieval server group information to said user management server.

18. An information retrieval system as recited in claim 17, wherein each of said retrieval servers includes:

a file access section for reading in, when the loading instruction is received from said retrieval management server, one of the divided parts of the text base and the corresponding relating information designated by the name of the data file and the name of the relating information file included in the loading instruction;

a retrieval section for performing, when a retrieval request is received from said user management server, information retrieval for the divided part of the text base read in by said file access section; and a retrieval result send-out section for returning a result of the retrieval by said retrieval section to said user management server.

19. An information retrieval system as recited in claim 8, wherein each of said retrieval servers includes:

a file access section for reading in, when the loading instruction is received from said retrieval management server, one of the divided parts of the text base and the corresponding relating information designated by the name of the data file and the name of the relating information file included in the loading instruction;

a retrieval section for performing, when a retrieval request is received from said user management server, information retrieval for the divided part of the text base read in by said file access section; and a retrieval result send-out section for returning a result of the retrieval by said retrieval section to said user management server.

20. An information retrieval system, comprising:

a plurality of retrieval servers for performing retrieval processing;

a retrieval management server for managing operation of said plurality of retrieval servers;

said retrieval management server being constructed so as to divide a text base of a retrieval object and relating information regarding the text base and allocate resulting divided parts of the text base and the relating information corresponding to the divided parts in sets to some or all of said plurality of retrieval servers;

said plurality of retrieval servers being constructed so as to perform information retrieval for the divided parts of the text base allocated by said retrieval management server parallelly to and independently of each other;

a user management server for accepting a retrieval request from a user process, said user management server being constructed so as to inquire said retrieval management server for information of a group of those of said retrieval servers which are performing retrieval for the text base of a retrieval object in response to the retrieval request from the user process and directly request the retrieval servers in the group for actual retrieval based on a result of the inquiry, wherein said user management server includes a retrieval request acceptance section for accepting the retrieval request from the user process;

a retrieval server inquiry section for inquiring, in response to the retrieval request accepted by said retrieval request acceptance section, said retrieval management server for the information of the group of those of said retrieval servers to which retrieval processing for the text base of a retrieval object of the retrieval request is allocated;

a retrieval request section for sending out, based on the information of the group of those of said retrieval servers obtained from said retrieval management server by said retrieval server inquiry section, a retrieval request directly to those of said retrieval servers to which the retrieval processing for the text base of a retrieval object of the retrieval request is allocated; and a retrieval result transfer section for merging responses to the retrieval request of said retrieval request section from the retrieval servers and transferring the merged responses as a result of retrieval to the user process of the source of the retrieval request; and wherein said retrieval management server includes, a retrieval server management section for managing, for each of said retrieval servers, retrieval server information including a name of the text base for which the retrieval server takes charge of retrieval, an amount of data of one of the divided parts for which the retrieval server takes charge of retrieval of the text base, and an available memory amount;

a loading information management section for managing loading information regarding a group of those of said retrieval servers which are destinations of loading of the text base of a retrieval object;

a text base management section for managing, for each of text bases each of which may serve as the text base of a retrieval object, a name of the text base, a name of a data file for storing a substance of the text base, a name of a relating information file for storing relating information regarding the text base, and information of a retrieval algorithm to be used;

a division number decision section for deciding, when the text base of a retrieval object of the inquiry request received from said user management server is not loaded as yet, a division number of the text base based on size information of the text base, the information of the retrieval algorithms managed by said text base management section and the available memory amounts of said retrieval servers managed by said retrieval server management section;

a retrieval server allocation section for selectively allocating, in accordance with the division number decided by said division number decision section and the available memory amounts of said retrieval servers, the text base and the relating information of the text base to said retrieval servers in the descending order of the available memory amount;

a loading instruction section for sending, based on a result of the allocation by said retrieval server allocation section, a loading instruction for loading one of the divided parts of the text base and the relating information into a designated one of said retrieval servers to those of said retrieval servers, to which retrieval is allocated by said retrieval server allocation section, together with the name of the data file and the name of the relating information file obtained from said text base management section; and a loading information transfer section for transferring loading information regarding the group of those of said retrieval servers to which the text base is allocated by said retrieval server allocation section as retrieval server group information to said user management server.

21. An information retrieval system as recited in claim 20, wherein, when a number of those of said retrieval servers equal to the division number determined by said division number decision section cannot be allocated by said retrieval server allocation section, the division number of the text base determined by said division number decision section is reconsidered, and processing by said retrieval server allocation section, said loading instruction section and said loading information transfer section is performed in accordance with the reconsidered division number.

22. An information retrieval system as recited in claim 20, wherein, when the text base of a retrieval object of the inquiry request received from said user management server is loaded already, said loading information transfer section transfers the loading information regarding the text base of a retrieval object managed by said loading information management section as retrieval server group information to said user management server.

23. An information retrieval system as recited in claim 22, wherein each of said retrieval servers includes:

a file access section for reading in, when the loading instruction is received from said retrieval management server, one of the divided parts of the text base and the corresponding relating information designated by the name of the data file and the name of the relating information file included in the loading instruction;

a retrieval section including a plurality of different retrieval algorithms for performing, when a retrieval request is received from said user management server, information retrieval for the divided part of the text base read in by said file access section using one of the retrieval algorithms designated by the retrieval algorithm information from said retrieval management server; and a retrieval result send-out section for returning a result of the retrieval by said retrieval section to said user management server.

24. An information retrieval system as claimed in claim 21, wherein, when the text base of a retrieval object of the inquiry request received from said user management server is loaded already, said loading information transfer section transfers the loading information regarding the text base of a retrieval object managed by said loading information management section as retrieval server group information to said user management server.

25. An information retrieval system as recited in claim 24, wherein each of said retrieval servers includes:

a file access section for reading in, when the loading instruction is received from said retrieval management server, one of the divided parts of the text base and the corresponding relating information designated by the name of the data file and the name of the relating information file included in the loading instruction;

a retrieval section including a plurality of different retrieval algorithms for performing, when a retrieval request is received from said user management server, information retrieval for the divided part of the text base read in by said file access section using one of the retrieval algorithms designated by the retrieval algorithm information from said retrieval management server; and a retrieval result send-out section for returning a result of the retrieval by said retrieval section to said user management server.

26. An information retrieval system as claimed in claim 21, wherein, when the text base of a retrieval object of the inquiry request received from said user management server is loaded already, said division number decision section decides a division number of the text base based on size information of the text base, the retrieval algorithm information managed by said text base management section and the available memory amounts of said retrieval servers managed by said retrieval server management section, and when those of said retrieval servers whose available memory amount is larger than a predetermined value can be allocated by a number equal to the division number decided by said division number decision section from among said plurality of retrieval servers, said retrieval server allocation section selects the division number of those of said retrieval servers whose available memory amount is larger than the predetermined value and allocates the text base and the relating information to the selected retrieval servers, whereafter said loading instruction section sends, based on a result of the allocation by said retrieval server allocation section, a loading instruction for loading the divided parts of the text base and the relating information into the retrieval servers of the destinations of allocation to the retrieval servers of the destinations of allocation together with the name of the data file, the name of the relating information file and the retrieval algorithm information obtained from said text base management section and said loading information transfer section transfers loading information regarding the group of those of said retrieval servers to which the text base is allocated by said retrieval server allocation section as retrieval server group information to said user management server, but when those of said retrieval servers whose available memory amount is larger than the predetermined value cannot be allocated by a number equal to the division number determined by said division number decision section from among said plurality of retrieval servers, said loading information transfer section transfers the loading information of the text base of a retrieval object managed by said loading information management section as retrieval server group information to said user management server.

27. An information retrieval system as recited in claim 26, wherein each of said retrieval servers includes:
a file access section for reading in, when the loading instruction is received from said retrieval management server, one of the divided parts of the text base and the corresponding relating information designated by the name of the data file and the name of the relating information file included in the loading instruction;
a retrieval section including a plurality of different retrieval algorithms for performing, when a retrieval request is received from said user management server, information retrieval for the divided part of the text base read in by said file access section using one of the retrieval algorithms designated by the retrieval algorithm information from said retrieval management server; and
a retrieval result send-out section for returning a result of the retrieval by said retrieval section to said user management server.

28. An information retrieval system as recited in claim 21, wherein each of said retrieval servers includes:
a file access section for reading in, when the loading instruction is received from said retrieval management server, one of the divided parts of the text base and the corresponding relating information designated by the name of the data file and the name of the relating information file included in the loading instruction;
a retrieval section including a plurality of different retrieval algorithms for performing, when a retrieval request is received from said user management server, information retrieval for the divided part of the text base read in by said file access section using one of the retrieval algorithms designated by the retrieval algorithm information from said retrieval management server; and
a retrieval result send-out section for returning a result of the retrieval by said retrieval section to said user management server.

29. An information retrieval system as recited in claim 20, wherein, when the text base of a retrieval object of the inquiry request received from said user management server is loaded already, said division number decision section decides a division number of the text base based on size information of the text base, the retrieval algorithm information managed by said text base management section and the available memory amounts of said retrieval servers managed by said retrieval server management section, and when those of said retrieval servers whose available memory amount is larger than a predetermined value can be allocated by a number equal to the division number decided by said division number decision section from among said plurality of retrieval servers, said retrieval server allocation section selects the division number of those of said retrieval servers whose available memory amount is larger than the predetermined value and allocates the text base and the relating information to the selected retrieval servers, whereafter said loading instruction section sends, based on a result of the allocation by said retrieval server allocation section, a loading instruction for loading the divided parts of the text base and the relating information into the retrieval servers of the destinations of allocation to the retrieval servers of the destinations of allocation together with the name of the data file, the name of the relating information file and the retrieval algorithm information obtained from said text base management section and said loading information transfer section transfers loading information regarding the group of those of said retrieval servers to which the text base is allocated by said retrieval server allocation section as retrieval server group information to said user management server, but when those of said retrieval servers whose available memory amount is larger than the predetermined value cannot be allocated by a number equal to the division number determined by said division number decision section from among said plurality of retrieval servers, said loading information transfer section transfers the loading information of the text base of a retrieval object managed by said loading information management section as retrieval server group information to said user management server.

30. An information retrieval system as recited in claim 29, wherein each of said retrieval servers includes:
a file access section for reading in, when the loading instruction is received from said retrieval management server, one of the divided parts of the text base and the corresponding relating information designated by the name of the data file and the name of the relating information file included in the loading instruction;
a retrieval section including a plurality of different retrieval algorithms for performing, when a retrieval request is received from said user management server, information retrieval for the divided part of the text base read in by said file access section using one of the retrieval algorithms designated by the retrieval algorithm information from said retrieval management server; and
a retrieval result send-out section for returning a result of the retrieval by said retrieval section to said user management server.

31. An information retrieval system as recited in claim 20, wherein each of said retrieval servers includes:
a file access section for reading in, when the loading instruction is received from said retrieval management server, one of the divided parts of the text base and the corresponding relating information designated by the name of the data file and the name of the relating information file included in the loading instruction;
a retrieval section including a plurality of different retrieval algorithms for performing, when a retrieval request is received from said user management server, information retrieval for the divided part of the text base read in by said file access section using one of the retrieval algorithms designated by the retrieval algorithm information from said retrieval management server; and
a retrieval result send-out section for returning a result of the retrieval by said retrieval section to said user management server.

32. An information retrieval system, comprising:
a plurality of retrieval servers for performing retrieval processing; and
a retrieval management server for managing operation of said plurality of retrieval servers;
said retrieval management server being constructed so as to divide a text base of a retrieval object and relating information regarding the text base and allocate resulting divided parts of the text base and the relating information corresponding to the divided parts in sets to some or all of said plurality of retrieval servers;
said plurality of retrieval servers being constructed so as to perform information retrieval for the divided parts of the text base allocated by said retrieval management server parallelly to and independently of each other, and wherein said retrieval system further comprises, a user management server for accepting a retrieval request from a user process, said user management server being constructed so as to inquire said retrieval management server for information of a group of those of said retrieval servers which are performing retrieval for the text base of a retrieval object in response to the retrieval request from the user process and directly request the retrieval servers in the group for actual retrieval based on a result of the inquiry.

33. An information retrieval system as claimed in claim 32, wherein said user management server includes:

a retrieval request acceptance section for accepting the retrieval request from the user process;

a retrieval server inquiry section for inquiring, in response to the retrieval request accepted by said retrieval request acceptance section, said retrieval management server for the information of the group of those of said retrieval servers to which retrieval processing for the text base of a retrieval object of the retrieval request is allocated;

a retrieval request section for sending out, based on the information of the group of those of said retrieval servers obtained from said retrieval management server by said retrieval server inquiry section, a retrieval request directly to those of said retrieval servers to which the retrieval processing for the text base of a retrieval object of the retrieval request is allocated; and a retrieval result transfer section for merging responses to the retrieval request of said retrieval request section from the retrieval servers and transferring the merged responses as a result of retrieval to the user process of the source of the retrieval request.

* * * * *